US011765673B2

(12) United States Patent
Vaze et al.

(10) Patent No.: US 11,765,673 B2
(45) Date of Patent: Sep. 19, 2023

(54) SELECTIVE LISTENING FOR A TRACKING REFERENCE SIGNAL (TRS) DURING CONNECTED MODE DISCONTINUOUS RECEPTION (CDRX)

(71) Applicant: QUALCOMM Incorporated, San Diego, CA (US)

(72) Inventors: Chinmay Shankar Vaze, San Diego, CA (US); Alexei Yurievitch Gorokhov, San Diego, CA (US); Yongle Wu, San Diego, CA (US); Paolo Minero, La Jolla, CA (US); Hari Sankar, San Diego, CA (US); Ashok Mantravadi, San Diego, CA (US); Raghu Narayan Challa, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 17/405,824

(22) Filed: Aug. 18, 2021

(65) Prior Publication Data

US 2022/0070807 A1  Mar. 3, 2022

Related U.S. Application Data

(60) Provisional application No. 63/070,723, filed on Aug. 26, 2020.

(51) Int. Cl.
*H04W 56/00* (2009.01)
*H04W 76/28* (2018.01)
*H04L 5/00* (2006.01)

(52) U.S. Cl.
CPC ....... *H04W 56/0035* (2013.01); *H04L 5/0048* (2013.01); *H04W 56/001* (2013.01); *H04W 76/28* (2018.02)

(58) Field of Classification Search
CPC ........... H04W 56/0035; H04W 56/001; H04W 76/28; H04W 52/0219; H04W 52/0241;
(Continued)

(56) References Cited

U.S. PATENT DOCUMENTS

2011/0092231 A1* 4/2011 Yoo ..................... H04L 27/2662
455/501

FOREIGN PATENT DOCUMENTS

WO 2019098924 A1 5/2019
WO WO-2019195171 A1 * 10/2019 ........... H04L 5/0048

OTHER PUBLICATIONS

Huawei, et al., "Reference Signal for Fine Time and Frequency Tracking", 3GPP Draft, R1-1706939, 3GPP TSG RAN WG1 Meeting #89, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 14, 2017 (May 14, 2017), XP051272169, 6 Pages, Retrieved from the Internet: URL:http://www.3gpp.org/ftp/Meetings_3GPP_SYNC/RAN1/Docs/ [retrieved on May 14, 2017] paragraph [0002]—paragraph [02.2].

(Continued)

*Primary Examiner* — Justin T Van Roie
(74) *Attorney, Agent, or Firm* — Arun Swain; Weaver Austin Villeneuve & Sampson LLP

(57) ABSTRACT

A device may selectively listen for a tracking reference signal (TRS) during connected mode discontinuous reception (CDRx) based on whether the device is to switch between repeaters of a base station (such as during travel). A device may determine whether the device is in a high speed train (HST) scenario (such as based on a difference in frequency errors generated using a synchronization signal block (SSB) and generated using a TRS, based on a trajectory of a frequency error or a frequency error difference over
(Continued)

time, based on instantaneous frequency errors, etc.). When the device is in a HST scenario, the device listens for a TRS during CDRx, and the device generates a frequency error using the TRS. When the device is not in a HST scenario, the device prevents listening for a TRS during CDRx (with a SSB received during CDRx to be used to generate a frequency error).

26 Claims, 19 Drawing Sheets

(58) Field of Classification Search
CPC .......... H04W 52/0254; H04W 52/0216; H04L 5/0048; H04L 5/0051; H04L 27/2675; H04L 27/26885; H04L 2027/0093; H04L 27/0014; H04L 27/2657; Y02D 30/70
See application file for complete search history.

(56) References Cited

OTHER PUBLICATIONS

International Search Report and Written Opinion—PCT/US2021/046757—ISA/EPO—dated Jan. 5, 2022.

* cited by examiner

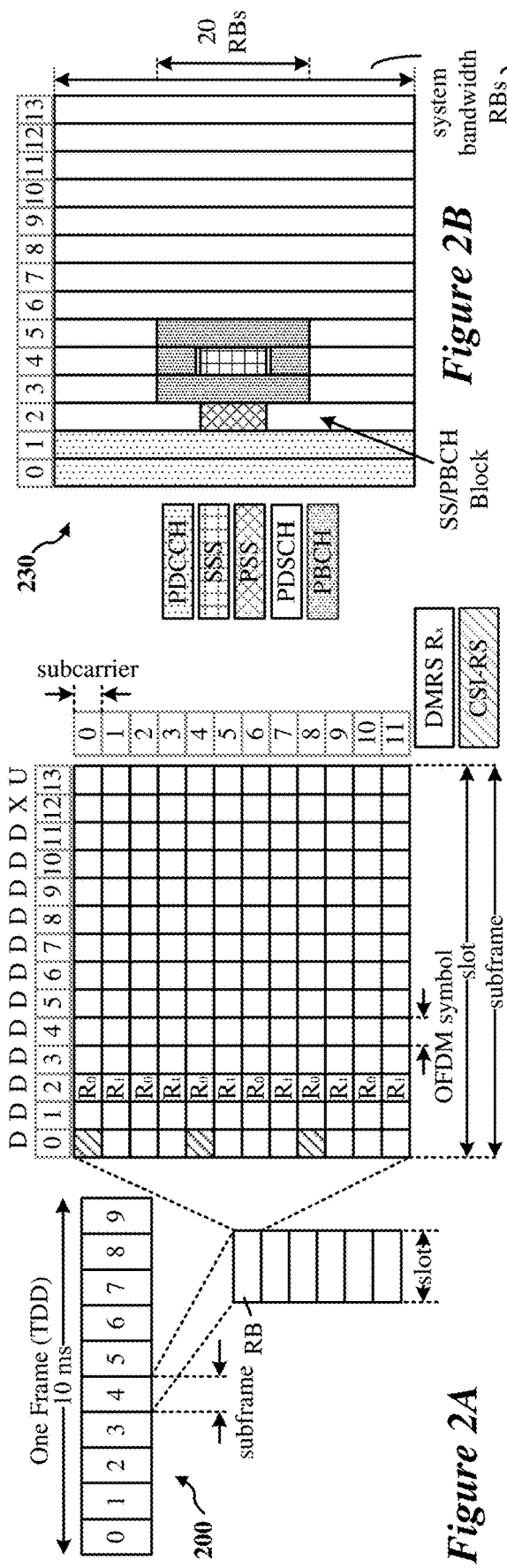
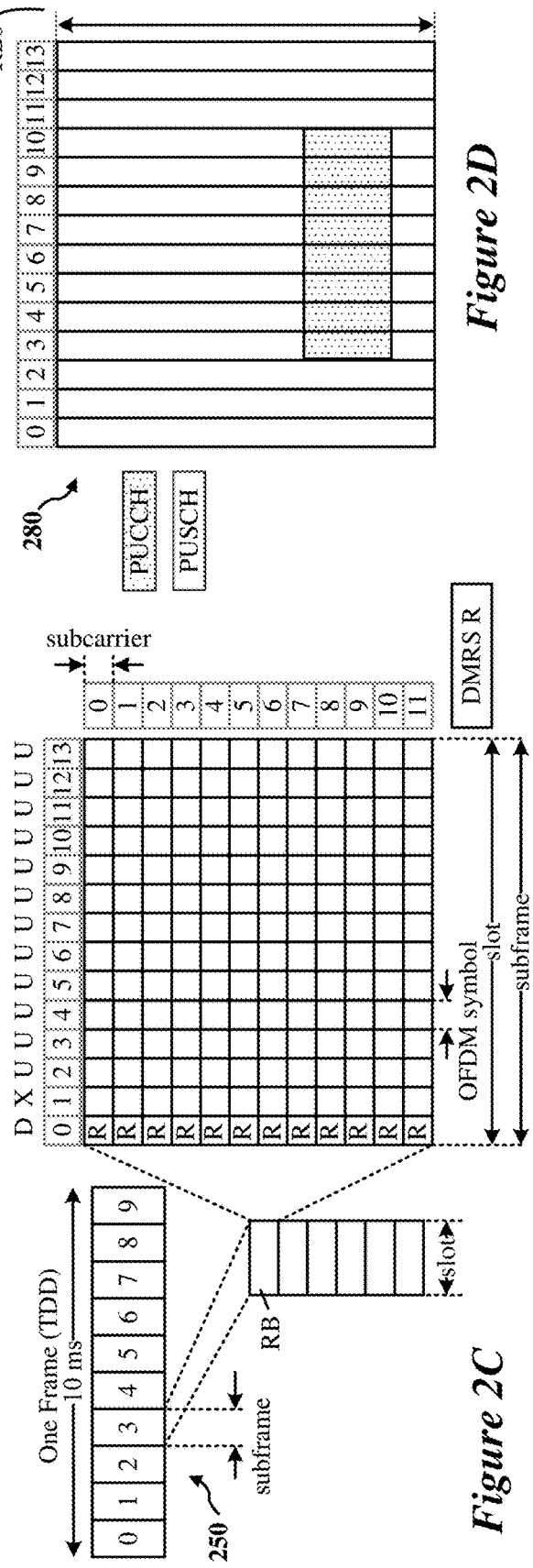

US 11,765,673 B2

SELECTIVE LISTENING FOR A TRACKING REFERENCE SIGNAL (TRS) DURING CONNECTED MODE DISCONTINUOUS RECEPTION (CDRX)

CROSS-REFERENCE TO RELATED APPLICATIONS

This Patent Application claims priority to U.S. Provisional Patent Application No. 63/070,723 entitled "SELECTIVE LISTENING FOR A TRACKING REFERENCE SIGNAL DURING CONNECTED MODE DISCONTINUOUS RECEPTION (CDRX)" and filed on Aug. 26, 2020, which is assigned to the assignee hereof. The disclosures of all prior Applications are considered part of and are incorporated by reference in this Patent Application.

TECHNICAL FIELD

This disclosure relates generally to wireless communications and, more specifically, to selectively listening for a tracking reference signal (TRS) during connected mode discontinuous reception (CDRx) to track a communication frequency.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

SUMMARY

The systems, methods and devices of this disclosure each have several innovative aspects, no single one of which is solely responsible for the desirable attributes disclosed herein.

One innovative aspect of the subject matter described in this disclosure can be implemented in a wireless communication device. An example wireless communication device includes a processing system and an interface. The processing system is configured to identify whether the wireless communication device is in a high speed train (HST) scenario. The processing system also is configured to generate a frequency error by one or more frequency tracking loops (FTLs). The interface is configured to obtain a tracking reference signal (TRS) during connected mode discontinuous reception (CDRx) when the wireless communication device is in the HST scenario. Generating the frequency error by the one or more FTLs includes using the TRS when the wireless communication device is in the HST scenario.

Another innovative aspect of the subject matter described in this disclosure can be implemented as a method of wireless communication. The method can be performed by a wireless communication device. The method can include identifying whether the wireless communication device is in a HST scenario. The method also can include receiving a TRS during CDRx when the wireless communication device is in the HST scenario. The method also can include generating a frequency error by one or more FTLs using the TRS when the wireless communication device is in the HST scenario.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example of a first 5G NR frame.

FIG. 2B shows example downlink (DL) channels within a 5G NR slot.

FIG. 2C shows an example of a second 5G NR frame.

FIG. 2D shows example uplink (UL) channels within a 5G NR slot.

Like reference numbers and designations in the various drawings indicate like elements.

DETAILED DESCRIPTION

Figure 1:
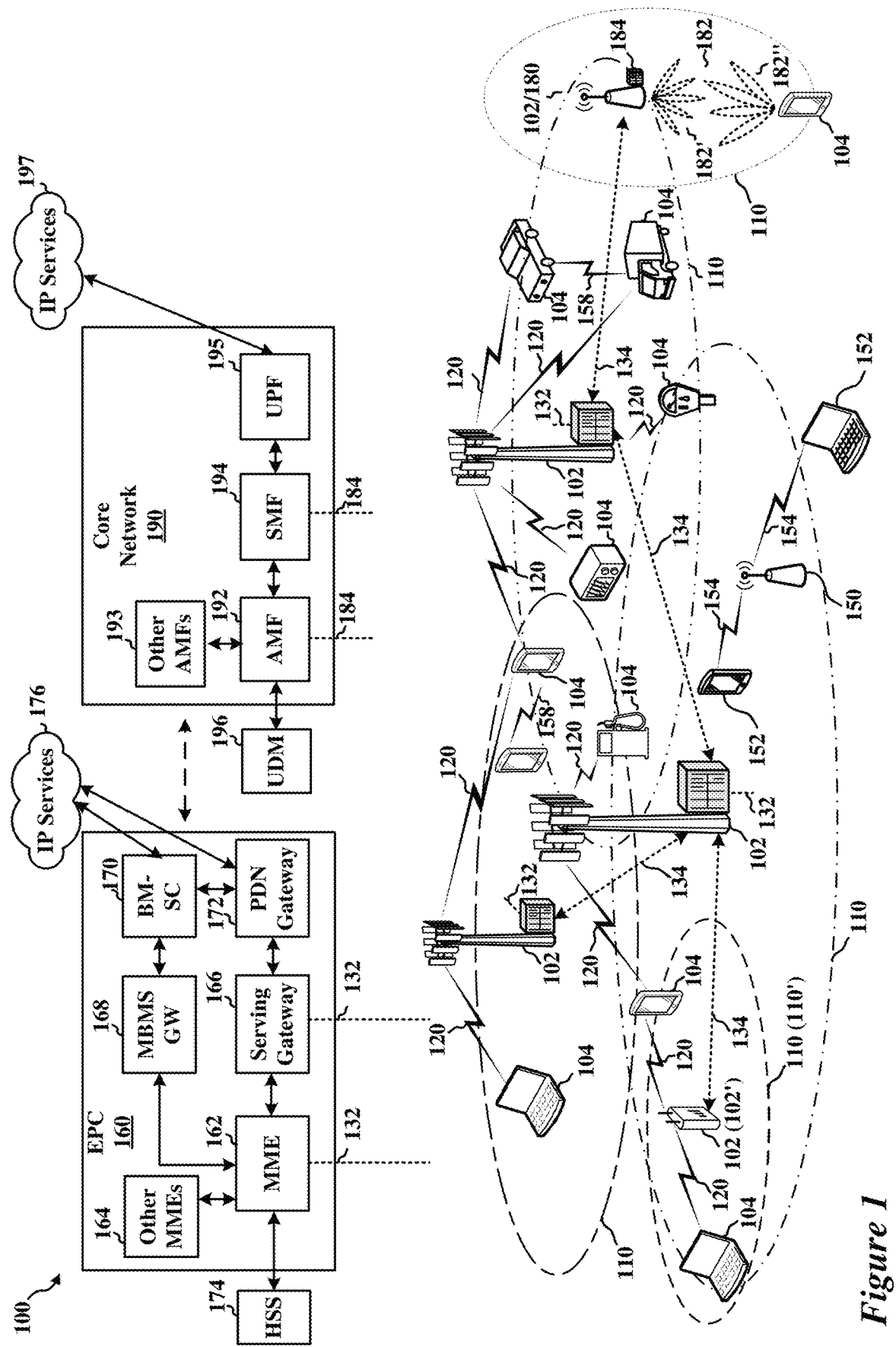
FIG. 1 shows a diagram illustrating an example wireless communications system.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the BLUETOOTH® (Bluetooth) standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

A base station (BS) may be coupled to one or more repeaters (also referred to as a remote radio head (RRH)) to extend the coverage area of the BS. Extending the coverage area of a BS may be useful for devices that move through the coverage area (such as for a device travelling on a high speed train (HST)). A BS using one or more repeaters allows the device to stay connected to the BS for longer (thus reducing the number of handovers between BSs). In addition, many mobile devices (such as smartphones) support connected mode discontinuous reception (CDRx, such as defined in Release 8 of the Third Generation Partner Project (3GPP) standard), which allows the mobile device to place one or more wireless communication components in a low power state without losing a connection to the network. During CDRx, the device periodically "wakes up" (removing one or more components out of a low power state) to listen for information from a BS. One item listened for is a synchronization signal block (SSB), and a received SSB is used in preserving the connection with the network by being used in determining a frequency error in a carrier frequency used by a BS to communicate with the mobile device. SSBs may be sufficient for determining the frequency error in a carrier frequency when the device is not moving or moving slowly (and thus few, if any, switches occur between repeaters associated with different transmission configuration indicator (TCI) states). However, the SSB may not be sufficient for determining a frequency error for a carrier frequency when the device is moving at a faster speed (which may include increased switching between repeaters associated with different TCI states). The device also may listen for a tracking reference signal (TRS) during CDRx, which is used in determining a frequency error in the carrier frequency. A problem with listening for the TRS during CDRx is that more components of the device are required to be awake for longer to listen for the TRS and SSBs (instead of just SSBs), thus requiring more processing and power resources. The ability of a device to selectively determine when to listen for the TRS and when not to listen for the TRS during CDRx is of particular interest.

Implementations of the subject matter described in this disclosure may be used by a wireless communication device (such as a user equipment (UE)) to determine when to listen for a TRS and when not to listen for a TRS during CDRx. In accordance with various aspects of the present disclosure, a UE may determine when to listen for a TRS during CDRx based on whether the UE is moving or otherwise in a scenario requiring switching between RRHs of a BS. For example, the UE may determine whether the UE is in a high speed train (HST) scenario (such as based on a difference in a frequency error generated using an SSB and generated using a TRS, based on a trajectory of a frequency error or a frequency error difference over time, based on instantaneous frequency errors caused by switching between RRHs or other devices associated with different TCI states, or based on other suitable means). When the UE is moving (such as the UE being in a HST scenario), the UE listens for and obtains a TRS when the UE is in CDRx. The UE generates a frequency error by one or more frequency tracking loops (FTLs) using the TRS. The frequency error is used to lock onto a communication frequency by the UE for receiving information (from a BS or a repeater).

Particular implementations of the subject matter described in this disclosure can be implemented to realize one or more of the following potential advantages. Selectively determining when to listen for a TRS during CDRx may allow a device to reduce consumption of power and processing resources without sacrificing accuracy in generating a frequency error associated with a wireless communication frequency (which may change as a result of a doppler effect). For example, a device may listen for and use a TRS in generating the frequency error when the device is moving (such as on a HST) to cause the device to switch between repeaters of a BS (during which use of SSBs to generate the frequency error may not be accurate). Otherwise, the device may listen for and use SSBs to generate the frequency error when the device is not moving (such as not being on a HST). The device may prevent listening for the TRS during CDRx and allow one or more components to stay in a low power state for longer. In this manner, the TRS is listened for and used when needed to ensure accuracy in generating the frequency error (and thus allowing the device successfully to lock onto a communication frequency), and the TRS is not listened for and used when not needed to reduce consumption of power and processing resources.

FIG. 1 shows a diagram of an example wireless communications system 100. The wireless communications system 100 includes BSs 102, UEs 104, an Evolved Packet Core (EPC) 160, and another core network 190 (such as a 5G Core (5GC)). The BSs 102 may include macrocells (high power cellular BS) or small cells (low power cellular BS). The macrocells include BSs. The small cells include femtocells, picocells, and microcells.

The BSs 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as the S1 interface). The BSs 102 configured for 5G NR (collectively referred to as Next Generation RAN (NG-RAN)) may interface with core network 190 through backhaul links 184. In addition to other functions, the BSs 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The BSs 102 may communicate directly or indirectly (such as through the EPC 160 or core network 190) with each other over backhaul links 134 (such as the X2 interface). The backhaul links 134 may be wired or wireless.

The BSs 102 may wirelessly communicate with the UEs 104. Each of the BSs 102 may provide communication coverage for a respective geographic coverage area 110. There may be overlapping geographic coverage areas 110. For example, the small cell 102' may have a coverage area 110' that overlaps the coverage area 110 of one or more macro BSs 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the BSs 102 and the UEs 104 may include uplink (UL) (also referred to as reverse link) transmissions from a UE 104 to a BS 102 or downlink (DL) (also referred to as forward link) transmissions from a BS 102 to a UE 104. The communication links 120 may use multiple-input and multiple-output (MIMO) antenna technology, including spatial multiplexing, beamforming, or transmit diversity. The communication links may be through one or more carriers. The BSs 102/UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A BS 102, whether a small cell 102' or a large cell (such as a macro BS), may include an eNB, gNodeB (gNB), or another type of BS. Some BSs, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW BS. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW BS 180 may utilize beamforming 182 with the UE 104 to compensate for the extremely high path loss and short range.

The BS 180 may transmit a beamformed signal to the UE 104 in one or more transmit directions 182'. The UE 104 may receive the beamformed signal from the BS 180 in one or more receive directions 182". The UE 104 also may transmit a beamformed signal to the BS 180 in one or more transmit directions. The BS 180 may receive the beamformed signal from the UE 104 in one or more receive directions. The BS 180 and UE 104 may perform beam training to determine the best receive and transmit directions for each of the BS 180 and UE 104. The transmit and receive directions for the BS 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The BS also may be referred to as a gNB, Node B, evolved Node B (eNB), an access point, a base transceiver station, a radio BS, a radio transceiver, a transceiver function, a basic service set (BSS), an extended service set (ESS), a transmit reception point (TRP), or some other suitable terminology. The BS 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The wireless communications system 100 may utilize both licensed and unlicensed radio frequency spectrum bands. For example, the wireless system 100 may employ LTE License Assisted Access (LTE-LAA), LTE Unlicensed (LTE U) radio access technology, or 5G NR technology in an unlicensed radio band (such as the 5 GHz Industrial, Scientific, and Medical (ISM) band or the 6 GHz UNIT bands). When operating in unlicensed radio bands, wireless communication devices (such as the BSs 102 and UEs 104) may employ listen-before-talk (LBT) channel access mechanisms to ensure the channel is clear before transmitting data. In some instances, operations in unlicensed radio bands may be based on a carrier aggregation (CA) configuration in conjunction with component carriers (CCs) operating in a licensed band. Operations in unlicensed radio bands may include downlink transmissions, uplink transmissions, or both. Duplexing in unlicensed radio bands may be based on frequency division duplexing (FDD), time division duplexing (TDD) or a combination of both.

The wireless communications system 100 also may include or support vehicle-based communications. Vehicle-based communication networks may provide always on telematics where UEs 104, referred to herein as v-UEs, communicate directly to V2N, to pedestrian UEs (V2P), to infrastructure devices (V21), and to other v-UEs (such as via the network). The vehicle-based communication networks may support a safe, always-connected driving experience by providing intelligent connectivity where traffic signal/timing, real-time traffic and routing, safety alerts to pedestrians/bicyclist, collision avoidance information, and the like are exchanged.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. In some cases, the 5G/NR frame structure may be FDD in which, for a particular set of subcarriers (carrier system bandwidth), slots within the set of subcarriers are dedicated for either DL or UL transmissions. In other cases, the 5G/NR frame structure may be TDD in which, for a particular set of subcarriers (carrier system bandwidth), slots within the set of subcarriers are dedicated for both DL and UL transmissions. In the examples shown in FIGS. 2A and 2C, the 5G/NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G/NR frame structure that is based on FDD.

Other wireless communication technologies may have a different frame structure or different channels. A frame may be divided into a number of equally sized subframes. For example, a frame having a duration of 10 microseconds (p) may be divided into 10 equally sized subframes each having a duration of 1 µs. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies (µ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols per slot and $2^\mu$ slots per subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz, and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 microseconds (µs).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100× is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as a synchronization signal block or SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the BS. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a BS for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
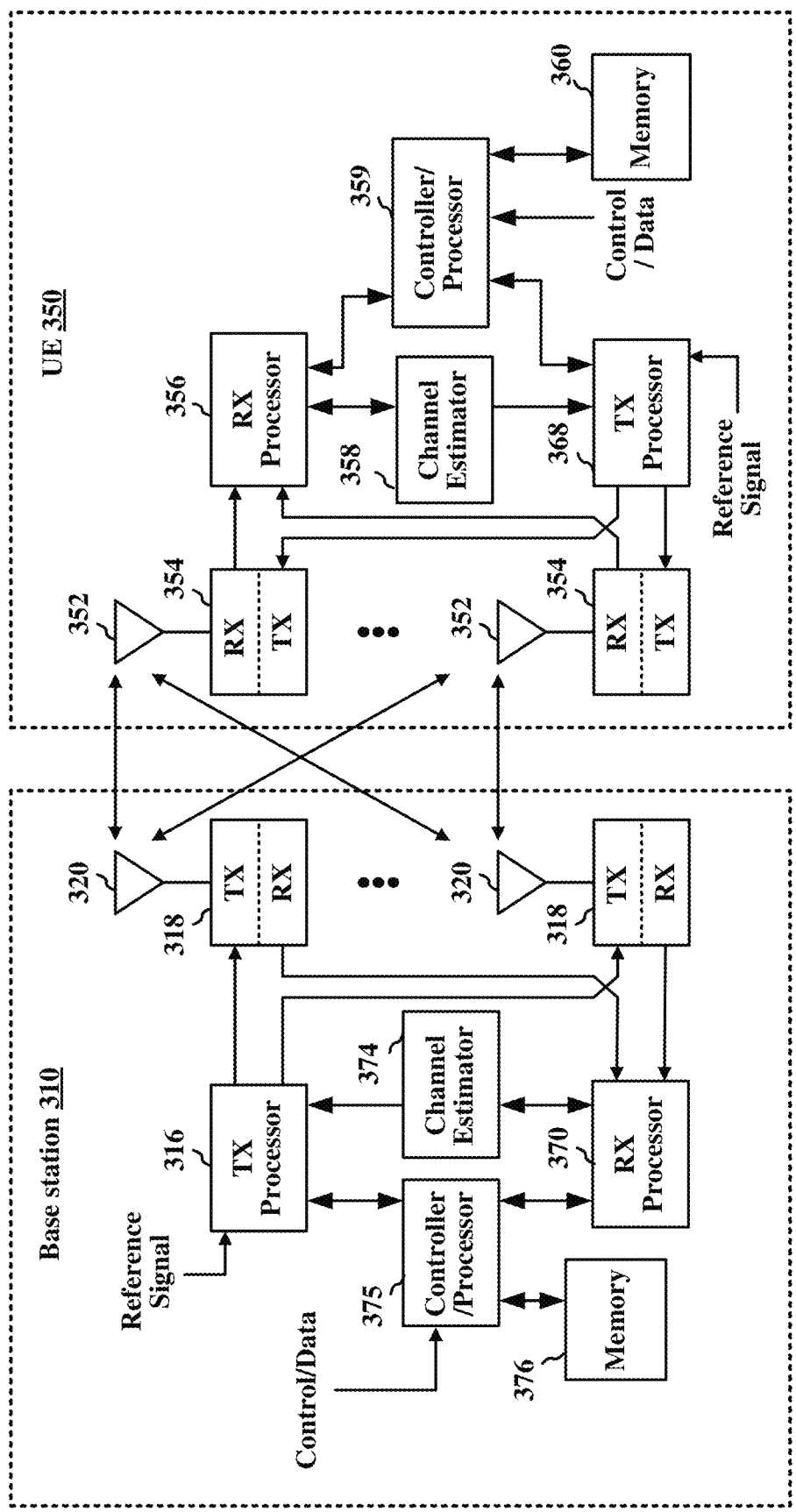
FIG. 3 shows a diagram illustrating an example base station (BS) and user equipment (UE).

FIG. 3 shows a block diagram of an example BS 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols then may be split into parallel streams. Each stream then may be mapped to an OFDM subcarrier, multiplexed with a reference signal (such as a pilot signal) in the time or frequency domain, and then combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream then may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the BS 310. These soft decisions may be based on channel estimates computed by the channel estimator 358. The soft decisions are then decoded and deinterleaved to recover the data and control signals that were originally transmitted by the BS 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the BS 310, the controller/processor 359 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the BS 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the BS 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. However, in actual implementations, many UEs have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

Referring back to FIG. 1, one or more of the BSs 102 may be coupled to one or more repeaters to extend the coverage area of the BS. In this manner, a UE 104 may remain connected to a single BS 102 for longer while moving (without requiring handover to a different UE 104). A BS 102 coupled to one or more repeaters may be in locations where a UE 104 may travel at a high speed or over long distances. In one example, BSs 102 coupled to repeaters to service UEs 104 may be located along highways or other roads for automobiles to travel at a high speed. In another example, BSs 102 coupled to repeaters to service UEs 104 may be located along train tracks (such as for a high speed train (HST), which may travel over 200 kilometers per hour (kph)). While the examples are described with reference to a device in a HST scenario, aspects of the present disclosure apply to a device that may move at a high speed (such as greater than a speed threshold) or may travel through a BS coverage area and switch between repeaters for the BS. As used herein, a HST scenario may refer to a device moving to cause switching between repeaters of a BS (such as travelling on a HST).

Figure 4:
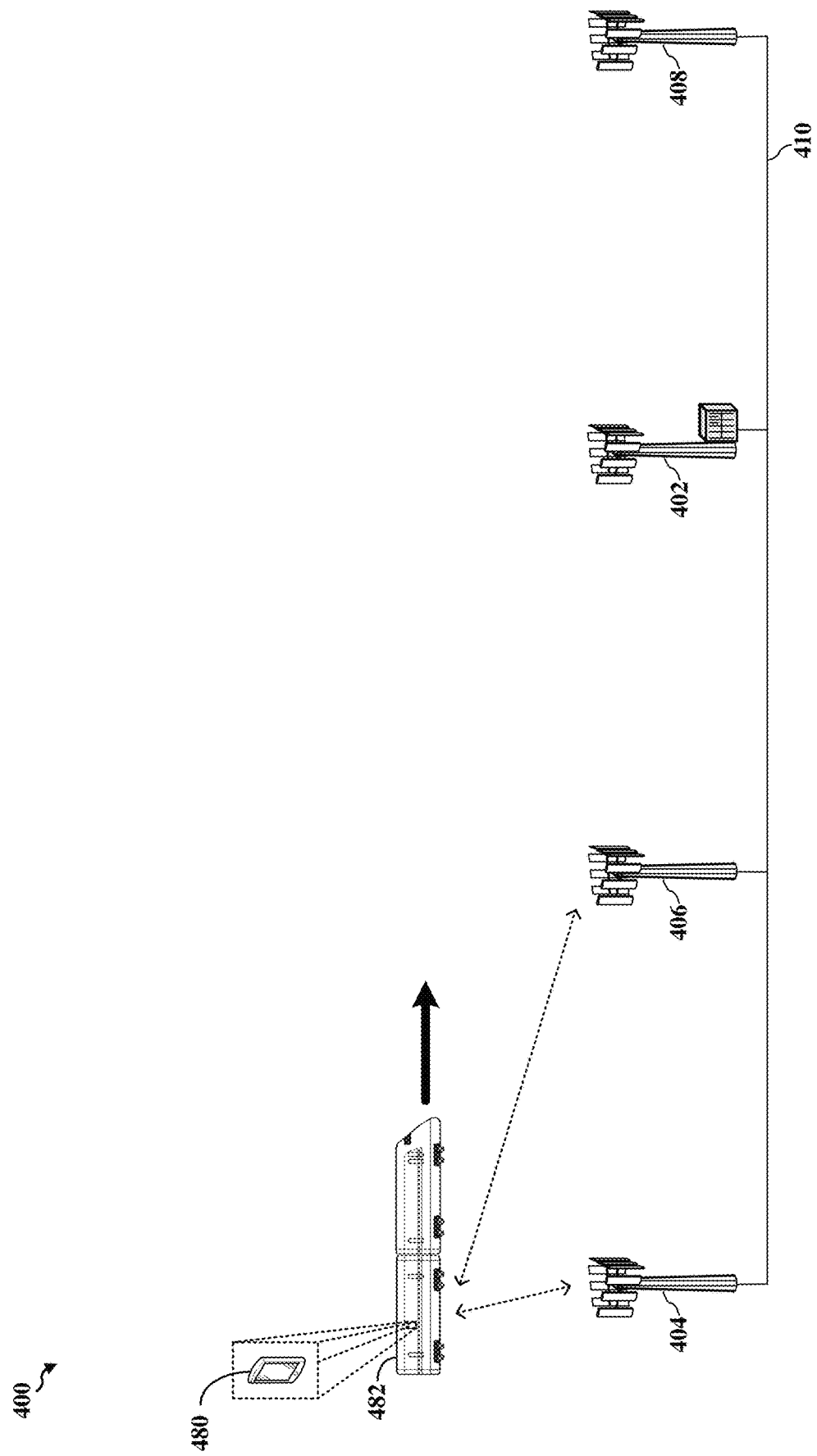
FIG. 4 shows an example communications system including a BS coupled to a plurality of repeaters.

FIG. 4 shows an example communications system 400 including a BS 402 coupled to a plurality of repeaters 404-408. The BS 402 and the repeaters 404-408 may be coupled to one another via a backhaul 410. While illustrated as a wired backhaul, the backhaul 410 may be any suitable wired or wireless backhaul for communicating between the one or more repeaters 404-408 and the BS 402. While three repeaters are illustrated in the example, any number of repeaters may be coupled to the BS (such as one or more repeaters).

Each repeater 404-408 coupled to a BS 402 is associated with a unique TCI state. In this manner, each repeater may transmit to one or more UEs within range of the repeater a downlink control information (DCI) message indicating the TCI state (such as via the PDCH (such as the PDCCH or PDSCH)). For example, a UE 480 on a HST 482 (or other moving vehicle) may be within a coverage area of the repeater 404 and a coverage area of the repeater 406, and the repeaters 404 and 406 indicate their respective TCI states in DCI messages to the UE 480. Each TCI state indicates one or more quasi co-location (QCL) relationships between RSs. In some implementations, the TCI state indicates a QCL relationship between the PDCH DM-RS and a TRS. As used herein, a TRS may refer to any suitable reference signal from the BS or repeater for tracking. For example, the TRS may include a phase tracking reference signal (PTRS) defined in the 3GPP releases of standards for 5G/NR. While the examples herein may refer to a PTRS as the TRS, any suitable tracking reference signal may be used, and the present disclosure is not limited to the provided examples.

As used herein, "tracking" may refer to determining a carrier frequency or otherwise locking onto a carrier frequency for communicating with a repeater or BS. Movement between the UE 480 and a repeater 404 may cause a doppler effect for signals transmitted between the UE 480 and the repeater 404. The doppler effect causes the frequency of a carrier signal being received at the UE 480 to be different than the frequency of the carrier signal being transmitted by the repeater 404. The UE 480 can receive SSBs and a TRS from the repeater 404. The SSBs or the TRS may be provided to one or more FTLs of the UE 480 to generate a frequency error associated with the carrier signal. For example, the desired carrier frequency (at which the repeater 404 transmits) may be known. The one or more FTLs may generate a frequency error as an indication of the difference between the frequency of the carrier signal as received (with the doppler effect) and the known frequency of the carrier signal at transmission. A local oscillator of the UE 480 may be adjusted to track the frequency of the carrier signal as received based on the frequency error and the known frequency of the carrier signal at transmission for the UE 480 to lock onto the carrier signal. Determining the frequency error using the one or more FTLs and adjusting a local oscillator is a recursive process to ensure that the UE 480 remains locked onto the carrier signal for communicating with the repeater 404.

Figure 5:
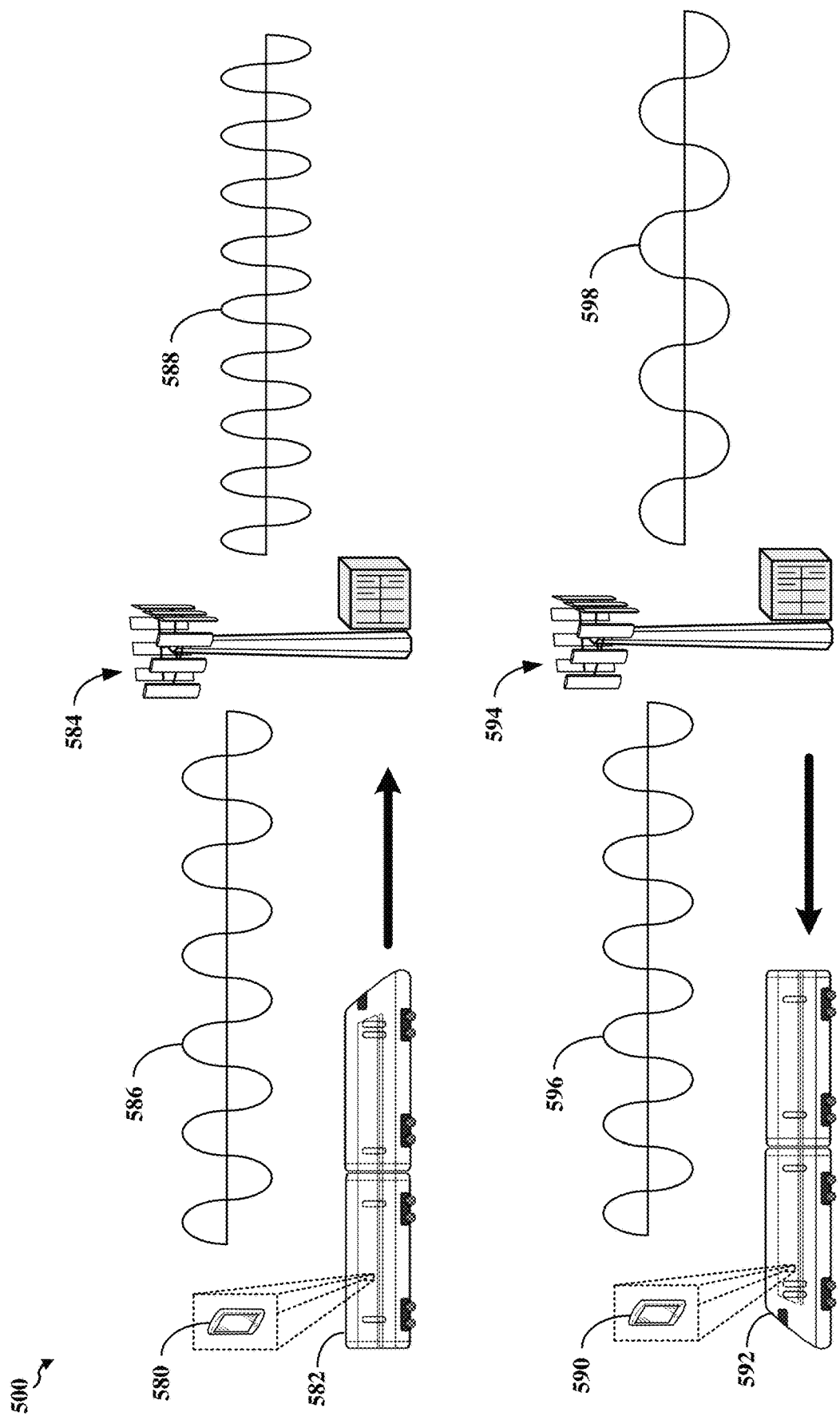
FIG. 5 shows a diagram illustrating an example UE on a high speed train causing a doppler effect for wireless communications between a BS and the UE.

FIG. 5 shows a diagram 500 illustrating an example UE on a HST causing a doppler effect for wireless communications between a BS and the UE. FIG. 5 is described with reference to communicating with a BS but also applies to communicating with a repeater coupled to the BS. FIG. 5 illustrates the UE 580 on a HST 582 moving towards a BS 584 to cause a doppler effect for wireless communications between the BS 584 and the UE 580. FIG. 5 also illustrates an example of a UE 590 on a HST 592 moving away from a BS 594 to cause a doppler effect for wireless communications between the BS 594 and the UE 590. The UEs 580 and 590 may be examples of the UE 480 in FIG. 4, and the BSs 584 and 594 may be examples of the BS 402 or one of the repeaters 404-408 in FIG. 4. Referring to the example of the HST 582 moving towards the BS 584, a carrier signal 586 may be used for wireless communication between the UE 580 (on the HST 582) and the BS 584. Since the HST 582 is moving towards the BS 584, the carrier signal received from the BS 584 at the UE 580 (as illustrated by signal 588) will be at a higher frequency than the carrier signal 586 when transmitted by the BS 584. For example, if the frequency of the carrier signal 586 is 1800 MHz, the HST 582 is travelling at 200 kph, and radio waves are assumed to travel at approximately the speed of light, the observed frequency of the signal 588 is approximately 2130 MHz. The observed frequency of signal 588 is approximately 330 MHz greater than the frequency of the carrier signal 586 transmitted at 1800 MHz.

Referring to the example of the HST 592 moving away from the BS 594, a carrier signal 596 may be used for wireless communication between the UE 590 (on the HST 592) and the BS 594. Since the HST 592 is moving away from the BS 594, the carrier signal received from the BS 594 at the UE 580 (as illustrated by signal 598) will be at a lower frequency than the carrier signal 596 when transmitted by the BS 594. For example, if the frequency of the carrier signal 596 is 1800 MHz, the HST 592 is travelling at 200 kph, and radio waves are assumed to travel at approximately the speed of light, the observed frequency of the signal 598 is approximately 1520 MHz. The observed frequency of signal 598 is approximately 280 MHz less than the frequency of the carrier signal 596 transmitted at 1800 MHz.

As noted above, a device (such as the UE 580 or 590) may include one or more frequency tracking loops (FTLs) used to generate a frequency offset and thus determine a carrier signal frequency (which also may be referred to as a communication frequency) or otherwise lock the device to the carrier signal frequency in the presence of a doppler effect. For example, the device receives a periodic signal (which may be any suitable reference signal), and the periodic signal is input into the one or more FTLs. The one or more FTLs generate a frequency error between the observed frequency of the carrier signal and the transmitter frequency of the carrier signal (such as generating an indication of the frequency error, such as an indication of 330 MHz greater than the transmitted frequency or 280 MHz less than the transmitted frequency from the above examples). As used herein, generating a frequency error refers to generating an indication of a frequency error. As used herein, the communication frequency is the combination of the observed frequency of the carrier signal and the frequency error. In some implementations, the one or more FTLs include one or more phase locked loops (PLLs) for a local oscillator (LO) to adjust a timing signal frequency of the device to lock onto the carrier signal. As used herein, locking onto a signal refers to an underlying oscillator or clock being used to match a carrier signal frequency to allow continued reception of information or transmission of information via the carrier signal.

In one example, the UE 580 or 590 periodically obtains SSBs (which include a PSS and a SSS) from a BS (or repeater), and the periodicity of the SSBs at transmission is known (such as based on the known carrier signal frequency). As noted above, the one or more FTLs may be used to generate the frequency error (which is based on a doppler effect) using the obtained SSBs and the known periodicity of the SSBs. For example, the UE 580 or 590 may determine a periodicity of the SSBs as obtained and compare the measured periodicity to the defined periodicity at transmission (with the frequency error indicated by a difference of the defined periodicity at transmission and the measured periodicity at reception). Referring to the above example of a HST 582 or 592 moving at 200 kph toward or away from the BS 584 or 594 and SSBs being transmitted from the BS 584 or 594 to the UE 580 or 590 at 1800 MHz, a frequency error may be either 1800-2130 MHz=−330 MHz when the UE 580 is moving towards the BS 584 or 1800 MHz-1520 MHz=280 MHz when the UE 590 is moving away from the BS 594. In some implementations, a negative frequency error may indicate the UE moving towards the BS, and a positive frequency error may indicate the UE moving away from the BS. However, any suitable nomenclature to indicate a frequency error may be used.

While generating a frequency error is described above with reference to periodic SSBs obtained from the BS (or repeater), similar steps may be performed using a different reference signal or signal component. For example, multiple instances of a PTRS (or other suitable TRS) may be obtained, and the one or more FTLs may be used to generate the frequency error based on the obtained PTRS instances. For example, the communication frequency (including a doppler effect) may be for a PDCH. As noted above, a PDCH DM-RS may be quasi-colocated (QCLed) with the TRS (such as the PTRS). For example, the two signals may be transmitted by co-located antennas such that the signals share similar properties, including a similar doppler shift and a similar doppler spread. The TCI state associated with the BS (or the repeater) indicates the QCL relationship between the PDCH DM-RS and the TRS. Therefore, the TRS can be used in place of the DM-RS to generate the frequency error and identify the communication frequency for the PDCH.

Many device and component manufacturers do not provide a QCL relationship between SSBs and the TRS. For example, a SSB may be physically co-located with a TRS because of the proximity of the antennas transmitting the SSB and the TRS, but the SSB may be beamformed differently than the TRS. Since the SSB may be beamformed differently than the TRS, the SSB and the TRS may not be QCLed. However, if no repeaters exist for a BS and if the SSB and TRS are transmitted by the same antennas co-located to one another at the BS, frequency or timing errors that are identified based on SSBs may not differ much from frequency or timing errors that are identified based on the TRS. Therefore, SSBs (instead of the TRS) may be used by the one or more FTLs to generate the frequency error and thus be used to determine the communication frequency for a PDCH (or another suitable channel).

Referring back to FIG. 4, for a BS 402 coupled to one or more repeaters 404-408, each repeater 404-408 transmits a SSB. Therefore, if a device is within range of multiple repeaters, the device may receive multiple instances of the SSB from the different repeaters. The multiple instances of SSBs from different repeaters may cause an issue in generating the proper frequency error for identifying the communication frequency, as the UE may listen for the SSB from the strongest signal (such as having the highest power as received at the UE). SSBs from different repeaters at different times may be conflated as being from a single repeater as the UE moves through the coverage area (and thus switching between repeaters, which may cause issues in tracking). In this manner, the device may use SSBs from a first repeater to determine a communication frequency for a different repeater with which the device is communicating. However, a TRS from each repeater is associated with a unique TCI state. If a device is to listen for a TRS, the device is configured to listen for a specific repeater's TRS based on the TCI state configured for the device. As a result, the wireless communication device is able to properly generate the frequency error using the TRS while moving among the repeaters (and thus switching between repeaters) of a BS. Therefore, in some instances, a TRS instead of SSBs should be used in generating a frequency error and thus in identifying a communication frequency.

When a wireless communication device is active (or otherwise not using CDRx), the wireless communication device is configured to listen for and obtain instances of a TRS in addition to SSBs. Therefore, the device is able to use the TRS in generating the frequency offset and thus determining the communication frequency. However, many devices support CDRx to conserve power and processing resources. CDRx allows an idle device to be in a low power state for a time known that the device does not need to listen for the BS (such as when the BS is to not transmit to the device) while maintaining a connection with the BS. A BS uses a discontinuous reception (DRx) cycle (such as a short or long DRx cycle, as described in Release 8 of the 3GPP standard) to schedule when to transmit to a UE. The UE places itself into a low power mode for a portion of each DRx cycle (when the BS would not transmit to the UE), and the UE is awake (and listening for signals from the BS) for the remainder of each DRx cycle.

When the UE is in CDRx, the UE obtains SSBs from the BS during the DRx cycles, but the UE may not obtain instances of the TRS when in CDRx by default in order to reduce the amount of time the UE is to remain awake during a DRx cycle. If SSBs may be used for tracking (such as when the UE is not moving or otherwise not switching between repeaters of a BS), the UE may not need to adjust its operation during CDRx for tracking. However, if instances of a TRS are to be obtained during CDRx (such as for tracking when the UE moves among repeaters of a BS), the UE configures itself to be awake for a longer portion of each DRx cycle and to obtain instances of the TRS.

Some wireless communication devices may be capable of recognizing a HST flag that may be set for a network that is servicing devices of users on a HST (such as UEs conforming to NR HST enhancements defined in release 16 of the 3GPP standard). When a UE connects to a BS of a network for a HST (servicing users of the HST system), a HST flag set to true may be obtained by the UE from the BS. The UE may alter its operation based on the obtained HST flag (such as obtaining instances of the TRS during CDRx for tracking). However, many devices (such as UEs prior to release 16 of the 3GPP standard) are not capable of recognizing a HST flag. In addition, a HST flag set to true may be received in some instances when SSBs may still be used for tracking.

For example, if a user is waiting on a train platform for an extended amount of time, the user's device does not move significantly (such as to cause switching between repeaters of a BS), and the received SSBs from a BS or repeater may be used to generate a frequency offset and thus determine a communication frequency. In addition, scenarios outside of a HST (for which the NR HST enhancements do not apply) also may exist for when the UE is to use a TRS for tracking. For example, a network servicing an automobile highway system may include BSs coupled to repeaters such that UEs moving fast enough through the network (and thus switching among repeaters) are to use a TRS for tracking instead of SSBs. Therefore, exclusive use of a HST flag may not be sufficient in determining when to use a TRS for tracking.

In some implementations, a wireless communication device selectively uses a TRS for tracking based on whether the device is in a HST scenario. Identifying whether the device is in a HST scenario may be based on one or more of frequency error differences between measurements of the frequency error using the TRS and SSBs, observations of instantaneous frequency errors resulting from TCI state changes in switching between repeaters, or observations of the frequency error difference increasing. Identifying whether the device is in a HST scenario also may be based on a measurement of the device's movement using one or more sensors or components (such as a motion sensor or accelerometer, global positioning system (GPS) receiver used in tracking device movement, Wi-Fi components for wireless positioning, and so on), or a location of the device based on known locations of networks associated with scenarios for which the device is to listen for a TRS during CDRx (such as a HST network). Various examples of a device identifying whether the device is in a HST scenario are provided below.

Figure 6:
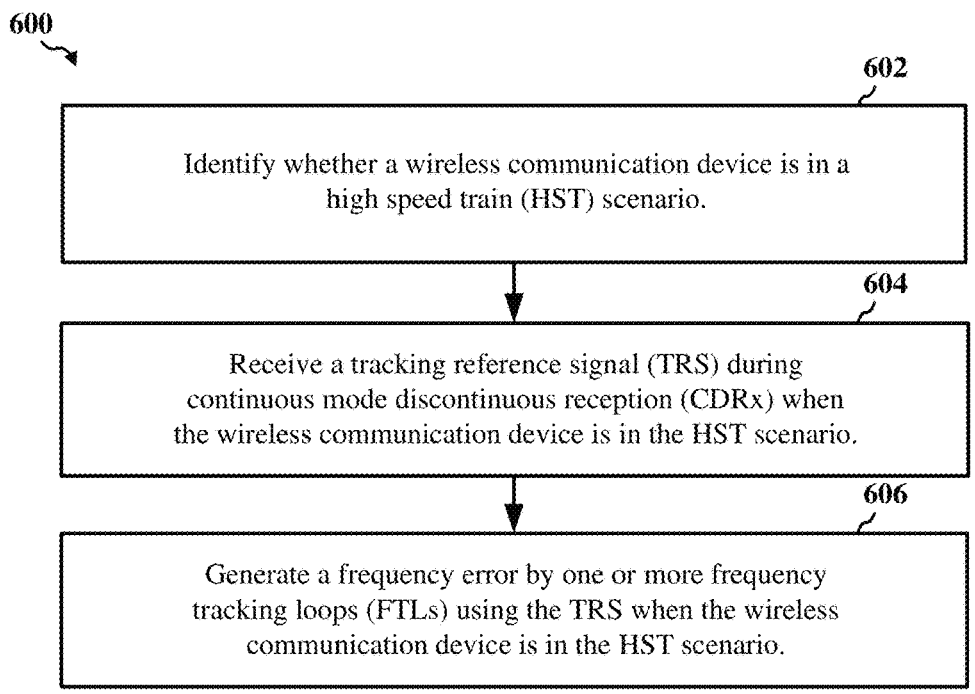
FIG. 6 shows a flowchart depicting an example operation for generating a frequency error.

FIG. 6 shows a flowchart depicting an example operation 600 for generating a frequency error (which may be used to determine a communication frequency by a wireless communication device). In some implementations, the example operation 600 may be performed by an apparatus of a wireless communication device. The wireless communication device may be a UE (such as a UE 104 in FIG. 1, UE 350 in FIG. 3, UE 480 in FIG. 4, or UE 580 or 590 in FIG. 5). In some other implementations, the wireless communication device may be a portion of the UE for performing wireless communications (such as a modem, a wireless front-end including or coupled to one or more antennas, and any other device components to perform the operations described herein). For example, the wireless communication device may include one or more of an antenna 352, a receiver 354RX, the RX processor 356, the channel estimator 358, or the controller 359 of the UE 350 in FIG. 3. In some implementations, the wireless communication device may include additional components not illustrated in FIG. 3, such as a motion sensor, GPS receiver, Wi-Fi components for wireless positioning, and so on. The example operation in FIG. 6 and additional example operations may be described below with reference to a UE for clarity in explaining aspects of the present disclosure, but any suitable wireless communication device (such as any suitable configuration of components included in a mobile station or UE) may be used in performing the described operations.

At 602, a wireless communication device identifies whether the wireless communication device is in a HST scenario. As described above, the wireless communication device being in a HST scenario may refer to the wireless communication device moving to cause switching between repeaters of a BS (such as for a UE travelling on a HST). For example, the wireless communication device may generate one or more of a frequency error, an instantaneous frequency error, a frequency error difference between a frequency error generated using a TRS and a frequency error generated using a SSB, or a trajectory of the frequency error to identify whether the wireless communication device is in a HST scenario (such as described in further detail in the examples below). In some implementations, the wireless communication device may determine a movement of the device (such as a speed or an acceleration) or a location of the device indicating that future movement is likely, which may be used in identifying whether the wireless communication device is in a HST scenario.

At 604, the wireless communication device receives a TRS during CDRx when the wireless communication device is in the HST scenario. For example, if the wireless communication device identifies that it is in a HST scenario (such as based on a frequency error difference or a frequency error trajectory) SSBs received during CDRx may not be sufficient for use by one or more FTLs in generating a frequency error and thus identifying a communication frequency. In this manner, the UE may configure itself to stay awake for a longer amount of time during one or more DRx cycles and listen for the TRS during CDRx (such as when the wireless communication device is idle). In this manner, the wireless communication device receives the TRS.

At 606, the wireless communication device generates a frequency error by one or more FTLs using the TRS when the wireless communication device is in the HST scenario. For example, the one or more FTLs may generate a frequency error based on a difference between a received frequency of the TRS and the known frequency of the TRS at transmission. As noted above, the wireless communication device may identify a communication frequency (which may be affected by a doppler shift or spread) based on the frequency error. For example, the frequency error may be added to or subtracted from the known transmission frequency of a carrier signal to determine the communication frequency of the carrier signal as received by the wireless communication device (which includes the doppler effect).

In some implementations, the UE may identify that the UE is not in the HST scenario. As noted above, when the UE is not in the HST scenario, SSBs received during CDRx may be sufficient for use by one or more FTLs in generating a frequency error.

Figure 7:
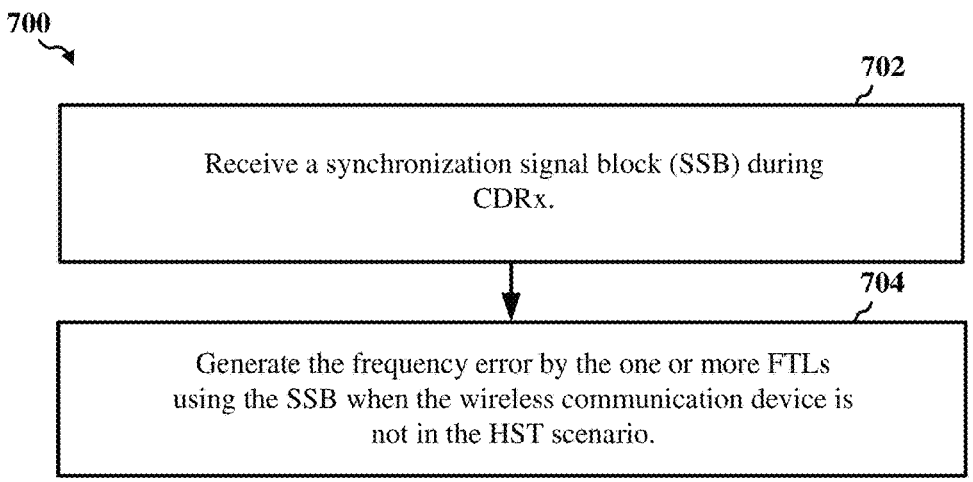
FIG. 7 shows a flowchart depicting another example operation for generating a frequency error.

FIG. 7 shows a flowchart depicting another example operation 700 for generating a frequency error. The operation 700 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 700 may be performed in addition to operation 600 in FIG. 6.

At 702, the wireless communication device receives a SSB during CDRx. For example, no matter whether the wireless communication device is to listen or not listen for a TRS during CDRx, the wireless communication device is scheduled to be awake to receive SSBs transmitted by a BS or repeater. At 704, the wireless communication device may generate the frequency error by the one or more FTLs using the SSB when the wireless communication device is not in the HST scenario. For example, the wireless communication device may identify that the wireless communication device is not in a HST scenario in step 602 (such as described in the examples below), which may indicate that generating the frequency error from the received SSBs may be sufficient for identifying the communication frequency or otherwise locking onto (such as remaining locked onto) a signal. In response to determining that the wireless communication device is not in the HST scenario, the wireless communication device may use one or more FTLs to determine the frequency error based on the SSB received during CDRx. For example, the FTLs may use the frequency of received SSBs or the timing of a received SSB as compared to the known transmission frequency or timing to generate the frequency error. As noted above, the frequency error may be added to or subtracted from the known transmission frequency of a carrier signal to determine the communication frequency of the carrier signal as received by the wireless communication device. Using SSBs instead of a TRS in generating the frequency error may allow one or more components of the wireless communication device to be in a low power mode when a TRS would be received, thus conserving power and processing resources.

Figure 8:
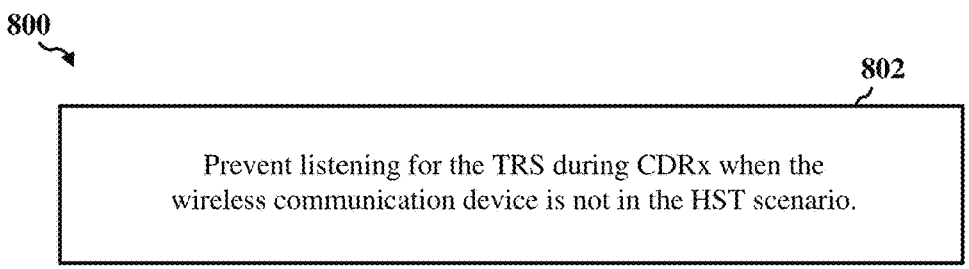
FIG. 8 shows a flowchart depicting an example operation for when a wireless communication device in not in a high speed train (HST) scenario.

FIG. 8 shows a flowchart depicting an example operation 800 for when the wireless communication device is not in a HST scenario. The operation 800 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 800 may be performed in addition to operation 700 in FIG. 7. At 802, the wireless communication device may prevent listening for the TRS during CDRx when the wireless communication device is not in the HST scenario. In this manner, at least portions of the wireless communication device may be in a low power state for a longer portion of each DRx cycle to conserve power and processing resources.

Multiple implementations exist for how the wireless communication device may determine whether the wireless communication device is in a HST scenario (and thus whether to listen for a TRS during CDRx). Some example implementations are described below. The below described implementations are examples and are not to limit the present disclosure to a specific implementation for how to determine whether a device is in a HST scenario.

In some implementations, identifying whether a wireless communication device is in a HST scenario may be based on an instantaneous frequency error. As used herein, an instantaneous frequency error may refer to a jump in frequency error between instances of the frequency error generated by the one or more FTLs. For example, the wireless communication device periodically generates a frequency error (such as multiple times per second). An instantaneous frequency error at a time t1 is based on a frequency error associated with time t1 and one or more frequency errors associated with times other than time t1. In some implementations, the instantaneous frequency error at a time t1 may be a difference between the frequency error at time t1 and a frequency error at a time t0 before t1. In some examples, the frequency error at time t0 and the frequency error at time t1 may be consecutive frequency error measurements by the wireless communication device. In some other examples, the frequency error at time t0 and the frequency error at time t1 may not be consecutive frequency error measurements (such as with one or more frequency error measurements performed between time t0 and time t1). As used herein, a frequency error measurement may refer to generating a frequency error by one or more FTLs.

In some implementations, the instantaneous frequency error at time t1 may be a difference between the frequency error at time t1 and a combination of a plurality of frequency errors before time t1 (such as a simple moving average, an exponential moving average, a simple median, a weighted median, and so on). While the examples below describe an instantaneous frequency error as a difference between a second frequency error and a first frequency error for clarity in describing aspects of the disclosure, any suitable means of generating an instantaneous frequency error may be used.

Figure 9:
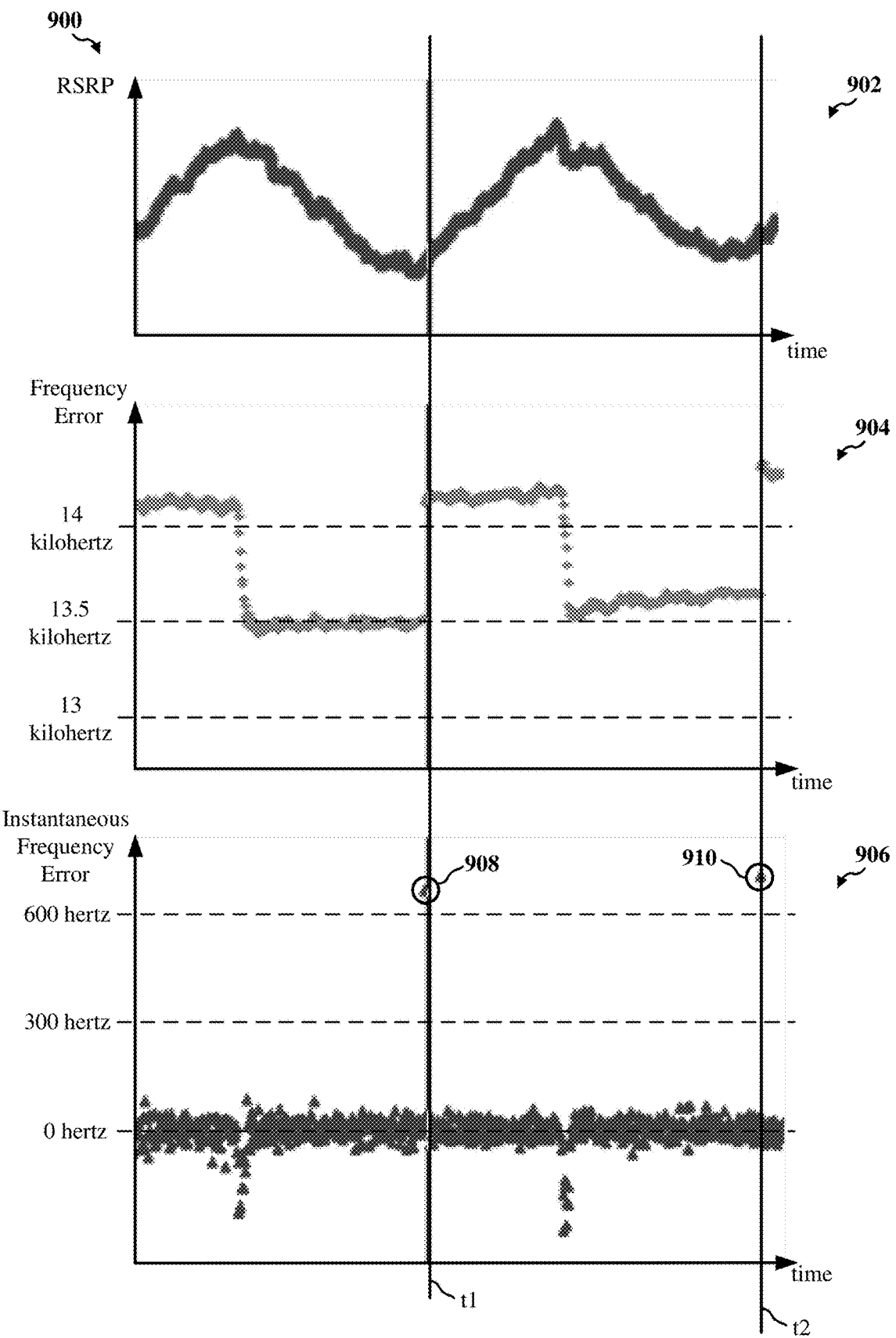
FIG. 9 shows a depiction of example measurements of frequency error and instantaneous frequency error.

FIG. 9 shows a depiction 900 of example measurements of frequency error and instantaneous frequency error. The frequency errors and instantaneous frequency errors are generated by a wireless communication device (such as a UE). The depiction 900 includes graphs 902-906. Graph 902 is of a reference signal receive power (RSRP) of a signal received by a UE from different repeaters over time. The RSRP may be measured in decibel milliwatts (dBm). The rise and fall of the RSRP over time may indicate the UE moving between coverage areas of different repeaters. For example, the RSRP increases when the UE moves towards a first repeater. The RSRP reaches its peak when the UE is its closest to the first repeater, and the RSRP decreases when the UE moves away from the first repeater. At some point near time t1 in the graph 702, the UE also is in a coverage area of a second repeater, and the UE also can receive a signal from the second repeater. The RSRP of the signal from the first repeater decreases (and the RSRP of the signal from the second repeater increases) as the UE continues to move away from the first repeater and towards the second repeater. Based on the RSRP of the signal from the first repeater reducing below a RSRP threshold (or the RSRP of the signal from the second repeater increasing above the RSRP of the signal from the first repeater or a RSRP threshold (such as an absolute RSRP threshold or a threshold relative to the RSRP of the signal from the first repeater)), the UE switches from using the first repeater to using the second repeater for service with the BS.

The second repeater is associated with a different TCI state than the first repeater, and the UE receives an indication of the new TCI state in the received signal. In response to receiving an indication of the new TCI state, the UE switches the TCI state and switches from listening for the TRS and obtaining instances of the TRS from the first repeater (based on the previous TCI state) to listening for the TRS and obtaining instances of the TRS from the second repeater (based on the new TCI state). For graph 900, the UE uses the first repeater for communication with the BS a majority of the time before time t1, and the UE uses the second repeater for communication with the BS a majority of the time between time t1 and time t2 (with the switch from the first repeater to the second repeater occurring sometime near time t1). As shown, a similar occurrence of the RSRP for signals from the second repeater and a third repeater may occur at time t2, and the UE may switch from the second repeater to the third repeater.

Graph 904 is of a frequency error generated by one or more FTLs of the UE over time. Each dot in the graph 904 represents a frequency error generated by the UE at that time. To generate the frequency errors, the UE provides the one or more obtained TRS instances to the one or more FTLs, and the one or more FTLs may generate the frequency error between the frequency of the signal as received by the UE and the frequency of the signal as transmitted by the repeater (such as described above). In some implementations, the frequency error may be generated as a voltage level, a current level, a digital value, or any other suitable indication of the shift in frequency of the carrier signal. A UE may provide the generated frequency error (such as a current) from the one or more FTLs to a local oscillator to adjust a signal output by the oscillator to a communication frequency at which the UE may receive (or may transmit) in order to compensate for the frequency error. As shown in graph 704 for the provided example, the frequency error may oscillate between approximately 13.5 kilohertz (kHz) and 14.2 kHz as the UE moves through coverage areas of the repeaters.

Comparing graph 902 and graph 904, when the UE is moving towards the first repeater (and the RSRP is increasing in graph 902), the frequency error is at a higher level (at over 14 kHz in graph 904). After the UE comes closest to the first repeater and begins to move away from the first repeater (and the RSRP is decreasing in graph 902), the frequency error decreases from over 14 kHz to approximately 13.5 kHz in graph 904. Graph 904 shows frequency errors determined between 14 kHz and 13.5 kHz during the times the UE is approaching and passing the first repeater (so that the UE begins to move away from the first repeater instead of moving towards the first repeater).

Time t1 indicates the time for which the UE generates a frequency error for a TRS instance received from the second repeater. As noted above, the UE switches from obtaining instances of the TRS from the first repeater to obtaining instances of the TRS from the second repeater at some time near (or at) time t1. As a result of switching from the first repeater to the second repeater for service by the BS, a doppler effect suddenly switches from being based on moving away from the serving repeater (the first repeater before t1) to moving towards the serving repeater (the second repeater after t1). In this manner, a jump in the frequency error generated by the UE may occur near the switch. For example, graph 904 illustrates that the generated frequency error may jump from approximately 13.5 kHz to over 14 kHz (without any frequency errors generated in between the jump). A difference in frequency errors at different times (such as consecutive frequency errors) may be referred to as an instantaneous frequency error, and the jump in frequency error may be captured in one of the instantaneous frequency errors. As noted above, the instantaneous frequency error may be the difference between two consecutive frequency errors. However, any suitable means for generating the instantaneous frequency error may be performed.

Graph 906 is of the instantaneous frequency errors generated for each frequency error in graph 904 in the depiction 900. Instantaneous frequency error 908 is the instantaneous frequency error associated with the first frequency error generated after switching repeaters. As shown, the instantaneous frequency error may be more than 600 Hz, which is the difference between the first frequency error of approximately 14.2 kHz (based on a first TRS instance from the second repeater) and the previous frequency error of approximately 13.5 kHz (based on a previous TRS instance from the first repeater). The instantaneous frequency errors subsequent to instantaneous frequency error 908 in graph 906 revert back to approximately 0 Hz (as subsequent frequency errors are generated to be approximately 14.2 kHz when the UE is moving towards the second repeater). Instantaneous frequency error 910 shows a similar jump in frequency error as a result of the UE switching from the second repeater to a third repeater.

As shown in graph 906, the instantaneous frequency errors as the UE reaches its closest to a repeater and begins to move away from the repeater may be different than approximately 0 Hz (such as −200 Hz). However, the magnitude of the instantaneous frequency error based on changing direction toward or away from the repeater is not as large as the instantaneous frequency error based on a switch between repeaters. In some implementations, identifying whether a UE is in a HST scenario using an instantaneous frequency error may include the UE comparing the instantaneous frequency error to a frequency threshold, which may indicate that the UE switches between repeaters if the instantaneous frequency error is greater than the frequency threshold.

Any suitable frequency threshold may be used. For example, the frequency threshold may be 400 Hz, 500 Hz, 600 Hz, or any other suitable number. In another example, the frequency threshold may be static or dynamic. For example, the frequency threshold may be set during device calibration or at the end of device production. In another example, the frequency threshold may be set by software or firmware. In a further example, the frequency threshold may be set by a user, determined based on previous instantaneous frequency errors generated, adjusted based on previous uses or by the user, or may be otherwise defined or adjusted in any suitable manner to attempt to indicate a switch between repeaters by the UE.

One or more instantaneous frequency errors being greater than the frequency threshold may indicate that a wireless communication device is in a HST scenario (or otherwise is in a scenario for which the wireless communication device is to listen for the TRS during CDRx and the TRS instances to be used for tracking). The wireless communication device may configure itself to receive instances of the TRS during CDRx for tracking when the wireless communication device is in the HST scenario. If the instantaneous frequency errors remain under the frequency threshold, the UE may use the SSBs received during CDRx for tracking.

Figure 10:
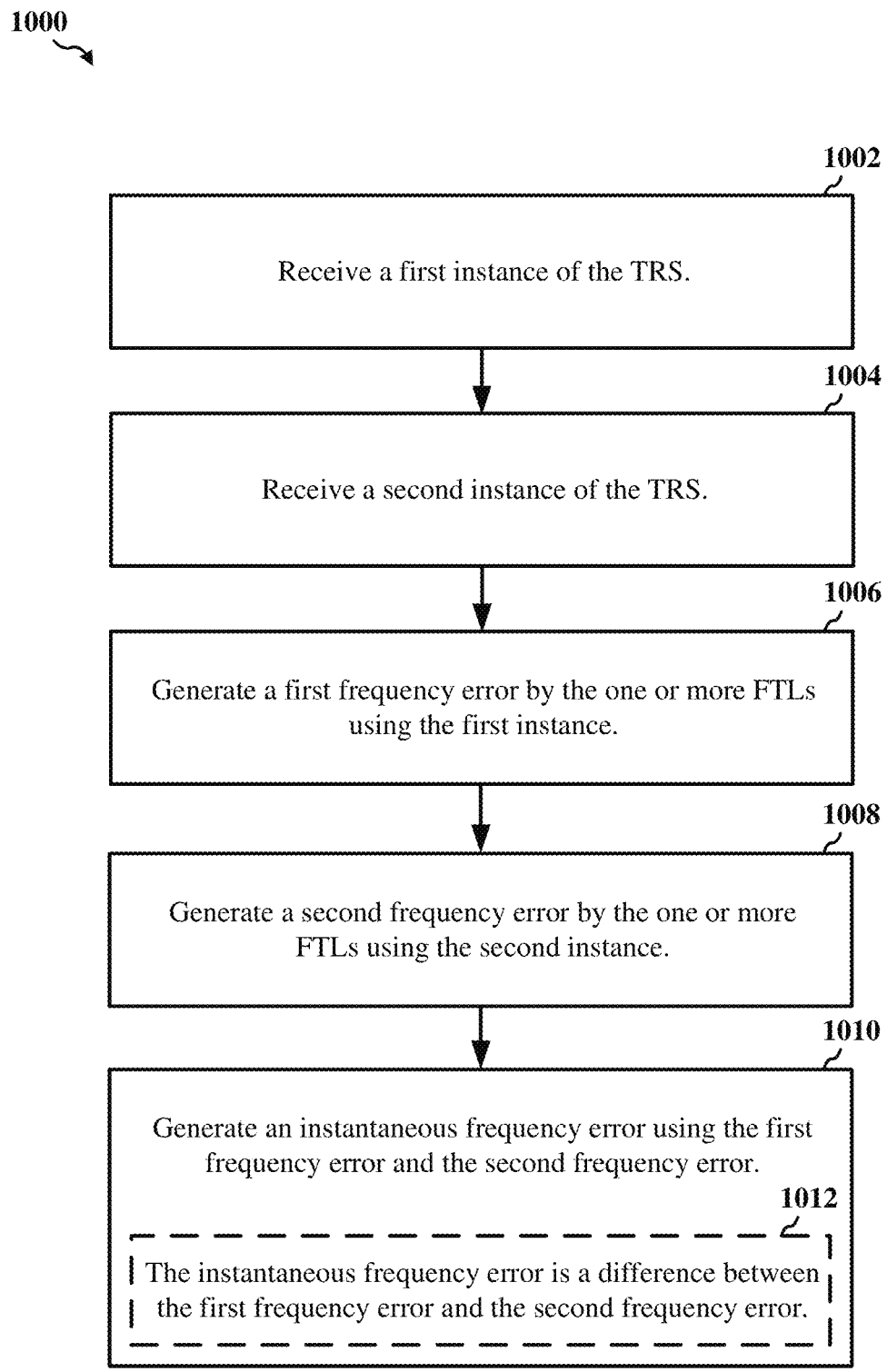
FIG. 10 shows a flowchart depicting an example operation for identifying whether a wireless communication device is in a HST scenario using an instantaneous frequency error.

FIG. 10 shows a flowchart depicting an example operation 1000 for identifying whether a wireless communication device is in a HST scenario using an instantaneous frequency error. The operation 1000 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 1000 may be performed in addition to operation 600 in FIG. 6.

At 1002, the wireless communication device receives a first instance of the TRS. At 1004, the wireless communication device receives a second instance of the TRS. For example, while the wireless communication device is active and listening for the TRS from a repeater, the wireless communication device receives instances of the TRS (which may be one or more frames or subframes of the signal). If a switch between repeaters occurs between receiving the first TRS instance and the second TRS instance, the first TRS instance may be from a first repeater before the switch, and the second TRS instance may be from the second repeater. If no switch occurs between receiving the TRS instances, the first and second TRS instances are from the same repeater. In some implementations, the TRS may be a PTRS that indicates a phase of a local oscillator at the transmitter or receiver used for locking onto a carrier signal. For example, a first TRS instance may indicate a first phase of a local oscillator at a first repeater that transmits the TRS at the first instance, and a second TRS instance may indicate a second phase of a local oscillator at a second repeater (if a switch occurs) or at the first repeater (if no switch occurs) that transmits the TRS at the second instance.

At 1006, the wireless communication device generates a first frequency error by the one or more FTLs using the first instance. At 1008, the wireless communication device generates a second frequency error by the one or more FTLs using the second instance. For example, if the TRS is a PTRS and the TRS instances indicate the phases of the local oscillator of the repeater, an obtained phase and an associated phase of the local oscillator at the wireless communication device (such as the phase of the local oscillator when receiving the TRS instance) may be provided to the one or more FTLs. The one or more FTLs may generate the associated frequency error based on the difference between the phases.

At 1010, the wireless communication device generates an instantaneous frequency error using the first frequency error and the second frequency error. In some implementations, the instantaneous frequency error is a difference between the first frequency error and the second frequency error (1012). However, the instantaneous frequency error may be generated in any suitable manner. At 812, the UE determines whether the instantaneous frequency error is greater than a frequency threshold (such as described above). If operation 1000 is performed in conjunction with operation 600, identifying whether the wireless communication device is in the HST scenario (602) includes identifying whether the instantaneous frequency error is greater than a frequency threshold. As noted above, the frequency threshold may be defined to differentiate between when the wireless communication device switches between repeaters and when the wireless communication device does not switch between repeaters.

If the wireless communication device determines that the instantaneous frequency error is greater than the frequency threshold, the wireless communication device may identify that the wireless communication device is in a HST scenario. In some implementations, identifying whether a wireless communication device is in a HST scenario is based on whether a plurality of instantaneous frequency errors is greater than the frequency threshold. For example, whether the UE is to listen for the TRS during CDRx may be based on the number of instantaneous frequency errors greater than the frequency threshold being greater than a threshold number. In this manner, if the number of switches between repeaters by the wireless communication device during a time period is greater than the threshold number, the number of instantaneous frequency errors generated during the time period is greater than the threshold number to indicate that the UE is in a HST scenario (and thus to listen for the TRS during CDRx). For example, if the time period is ten seconds and if the threshold number is zero, one repeater switch during a ten second period may indicate that the UE is to listen for the TRS during CDRx (with the number of instantaneous frequency errors greater than the threshold during the ten seconds being at least one).

Any suitable threshold number may be used. For example, a threshold number greater than zero may be used to accommodate any interference that may cause one or a few instantaneous frequency errors to incorrectly be greater than the frequency threshold. In another example, any suitable time period may be used (such as to balance latency that may be associated with increasing the time period with loss of accuracy that may be associated with decreasing the time period). The threshold number and the time period may be static or dynamic. For example, the threshold number or the time period may be set during device calibration or at the end of device production, may be set by software or firmware, may be set by a user, may be determined based on previous measurements, may be adjusted based on previous device use or by the user, or may be otherwise defined or adjusted in any suitable manner.

Figure 11:
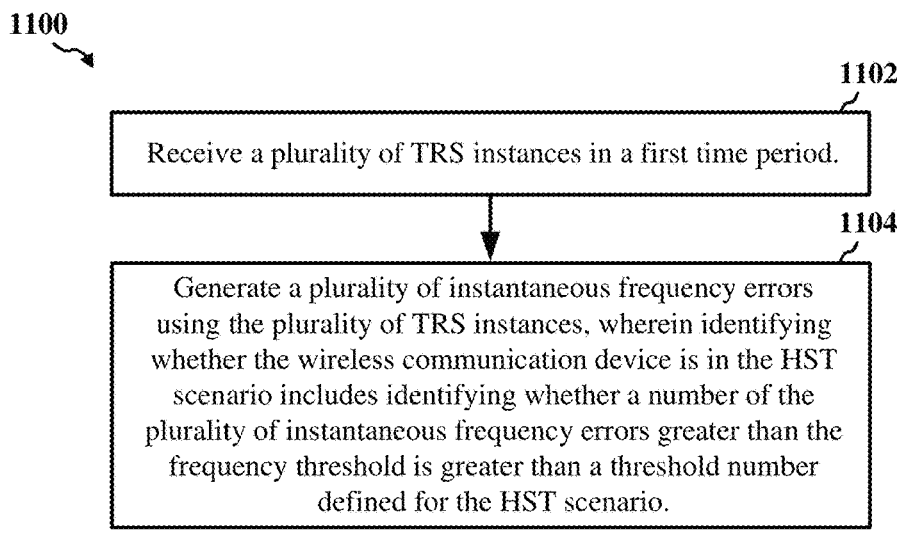
FIG. 11 shows a flowchart depicting an example operation for identifying whether a wireless communication device is in a HST scenario based on a number of instantaneous frequency errors.

FIG. 11 shows a flowchart depicting an example operation 1100 for identifying whether a wireless communication device is in a HST scenario based on a number of instantaneous frequency errors. The operation 1100 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 1100 may be performed in addition to operation 1000 in FIG. 10.

At 1102, the wireless communication device receives a plurality of TRS instances in a first time period. In some implementations, the plurality of TRS instances includes the first TRS instance and the second TRS instance from operation 1000. At 1104, the wireless communication device generates a plurality of instantaneous frequency errors using the plurality of TRS instances, where identifying whether the wireless communication device is in the HST scenario includes identifying whether a number of the plurality of instantaneous frequency errors greater than the frequency threshold is greater than a threshold number defined for the HST scenario.

Figure 12:
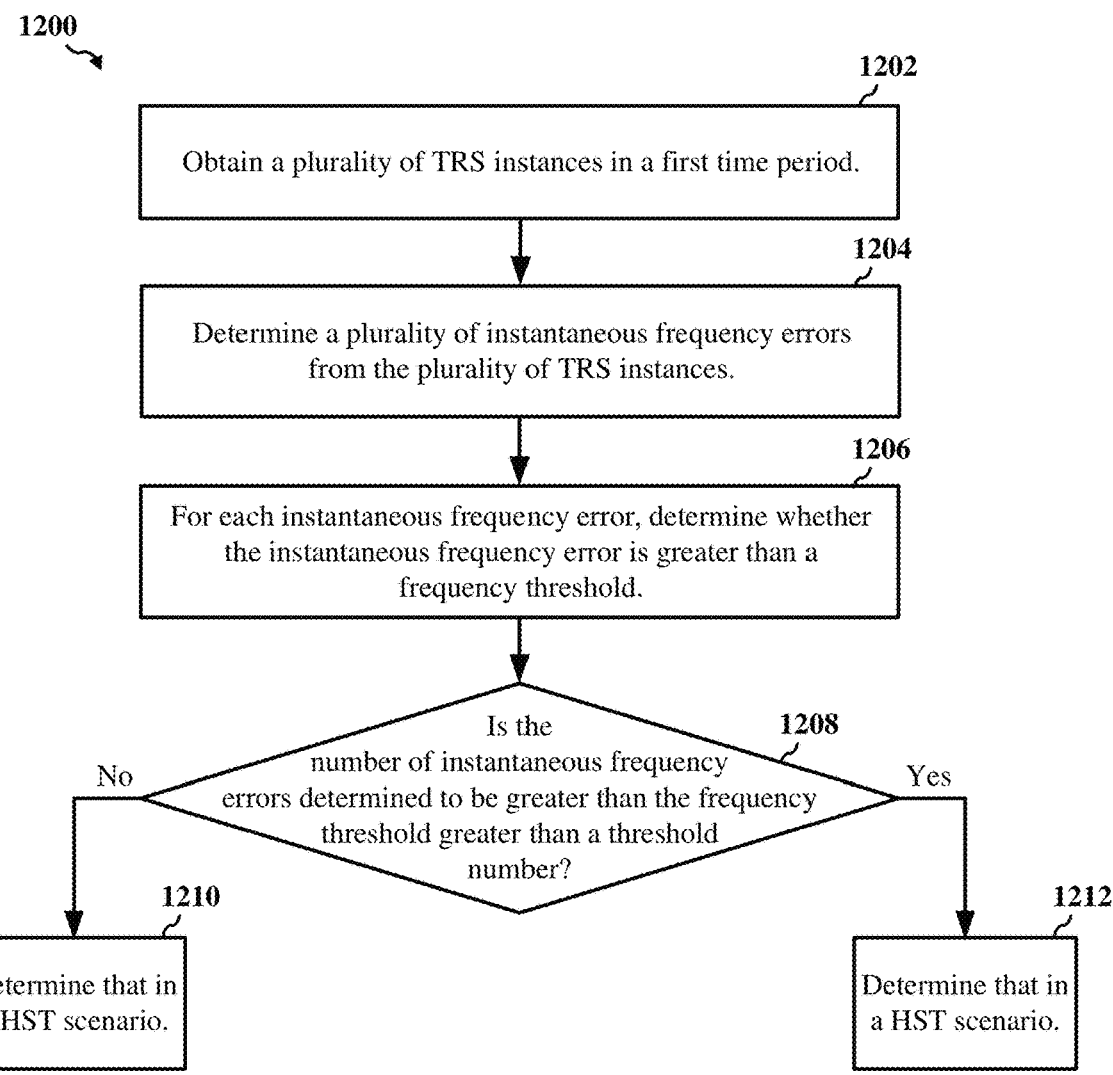
FIG. 12 shows a flowchart depicting another example operation for identifying whether a wireless communication device is in a HST scenario based on a number of instantaneous frequency errors.

FIG. 12 shows a flowchart depicting an example operation 1200 for identifying whether a wireless communication device is in a HST scenario based on a number of instantaneous frequency errors. The operation 1200 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 1200 may be an example implementation of operation 1100 in FIG. 11.

At 1202, the wireless communication device obtains a plurality of TRS instances in a first time period. In some implementations and tied to the operation 1000 in FIG. 10, the plurality of TRS instances may include the first instance and the second instance of the TRS. At 1204, the wireless communication device determines a plurality of instantaneous frequency errors from the plurality of TRS instances. For example, referring back to FIG. 9, the wireless communication device may determine a sequence of frequency errors illustrated in graph 904 for the time period. Referring back to FIG. 12, at 904, the wireless communication device may determine a plurality of instantaneous frequency errors from the plurality of TRS instances. For example, referring back to FIG. 9, the UE may determine a sequence of instantaneous frequency errors for the time period illustrated in graph 906 (as described above and associated with the corresponding portion of the graph 904 for the time period). For example, the wireless communication device may use the frequency errors determined during the time period to determine the differences between consecutive frequency errors in determining the sequence of instantaneous frequency errors.

Referring back to FIG. 12, at 1206, the wireless communication device determines, for each instantaneous frequency error, whether the instantaneous frequency error is greater than a frequency threshold. For example, each time an instantaneous frequency error is determined over time, the instantaneous frequency error is compared to the frequency threshold. At decision block 1208, the wireless communication device may determine whether the number of instantaneous frequency errors determined to be greater than the frequency threshold is greater than a threshold number (such as described above). If the number is not greater than the threshold number, the wireless communication device may determine that the wireless communication device is not in a HST scenario (1210), which may indicate that the wireless communication device is not in a scenario for which the wireless communication device is to listen for a TRS during CDRx. In some implementations, if the number is not greater than the threshold number, the wireless communication device is configured to use SSBs obtained during CDRx to generate a frequency error (instead of using the TRS). In this manner, the UE may prevent listening for the TRS during CDRx (such as allowing the UE to remain in a low power state longer during a DRx cycle).

Referring back to decision block 1208, if the number is greater than the threshold number, the wireless communication device may determine that the wireless communication device is in a HST scenario (1212), which may indicate that the wireless communication device is in a scenario for which the wireless communication device is to listen for a TRS during CDRx. In some implementations, if the number is greater than the threshold number, the wireless communication device is configured to listen for the TRS and obtain instances of the TRS during CDRx to generate a frequency error (instead of using SSBs).

In a specific example of operation 1200, the frequency threshold may be 600 Hz, the threshold number may be one, and the time period may be 15 seconds (with the graphs 902-906 spanning 15 seconds). Graph 904 illustrates the plurality of frequency errors determined during the time period, and graph 906 illustrates the plurality of instantaneous frequency errors determined for the plurality of frequency errors. Instantaneous frequency errors 908 and 910 are greater than the frequency threshold of 600 Hz, and the wireless communication device determines the number of instantaneous frequency errors greater than the frequency threshold to be two. Two is greater than the threshold number of one. As a result, the wireless communication device may be configured to listen for the TRS during CDRx (as the wireless communication device is in a HST scenario). In another specific example, the parameters are configured so that the wireless communication device determines that a frequency error jumps (such as the instantaneous frequency error being greater than a frequency threshold of 400 Hz or 600 Hz) two or more times during a five second time period to determine that the wireless communication device is in a HST scenario. However, as noted herein, any suitable parameters may be used to identify whether the wireless communication device is in a HST scenario.

If the wireless communication device is determined to be in a HST scenario, the wireless communication device is configured to obtain TRS instances no matter whether the wireless communication device is in an active state or the wireless communication device is in an idle state (during CDRx). As such, the wireless communication device may continue to generate instantaneous frequency errors and determine whether each instantaneous frequency error is greater than a threshold. The comparisons of the instantaneous frequency errors to a threshold while the wireless communication device is in the HST scenario may be used to determine whether the wireless communication device remains in the HST scenario as time passes.

In some implementations, the wireless communication device remains configured to listen for a TRS during CDRx while the wireless communication device is still in the HST scenario. The wireless communication device may remain in the HST scenario as long as one or more instantaneous frequency errors remain above a frequency threshold over time. For example, once the wireless communication device is configured to listen for TRS during CDRx as a result of the wireless communication device being in a HST scenario, the wireless communication device may determine whether a number of instantaneous frequency errors greater than a second frequency threshold over a second period of time is greater than a second threshold number.

Referring back to FIG. 9 for a specific example, if the wireless communication device is already determined to be in a HST scenario before the time associated with graphs 902-906, it may be determined whether the wireless communication device is still in the HST scenario based on determining that a number of instantaneous frequency errors being greater than a second frequency threshold is above a second threshold number.

The second frequency threshold used in determining whether the wireless communication device is still in the HST scenario may be the same or different than the above described frequency threshold used in determining whether the wireless communication device is in the HST scenario (such as for operations 1100 and 1200). The second threshold number used in determining whether the wireless communication device is still in the HST scenario may be the same or different than the above described threshold number used in determining whether the wireless communication device is in the HST scenario (such as for operations 1100 and 1200). The second time period used in determining whether the wireless communication device is still in the HST scenario may be the same or different than the above described time period used in determining whether the wireless communication device is in the HST scenario (such as for operations 1100 and 1200). For example, the second threshold number (used to determine whether the wireless communication device is still in the HST scenario) may be less than the threshold number previously used to determine that the wireless communication device is in the HST scenario. In this manner, remaining in the HST scenario (and thus being configured to listen for a TRS during CDRx) may be easier than first determining that the wireless communication device is in the HST scenario. In another example, the second threshold number may be the same as the threshold number previously used. In another example, the second time period used in determining whether the wireless communication device is still in a HST scenario may be longer than the time period used originally in determining whether the wireless communication device is in a HST scenario. In this manner, the second time period may be a sufficient length to compensate for possible stops and pauses in the wireless communication device moving. For example, the second time period may be of a sufficient length to accommodate a HST stopping at a station or briefly slowing down (such as for construction, emergency conditions, for passenger embarkation and disembarkation, and so on). However, if all parameters are the same in determining whether the wireless communication device is still in the HST scenario as in first determining that the wireless communication device is in the HST scenario, the operation for determining whether the wireless communication device is still in the HST scenario may be the same as example operation 1100 in FIG. 11 or operation 1200 in FIG. 12.

Figure 13:
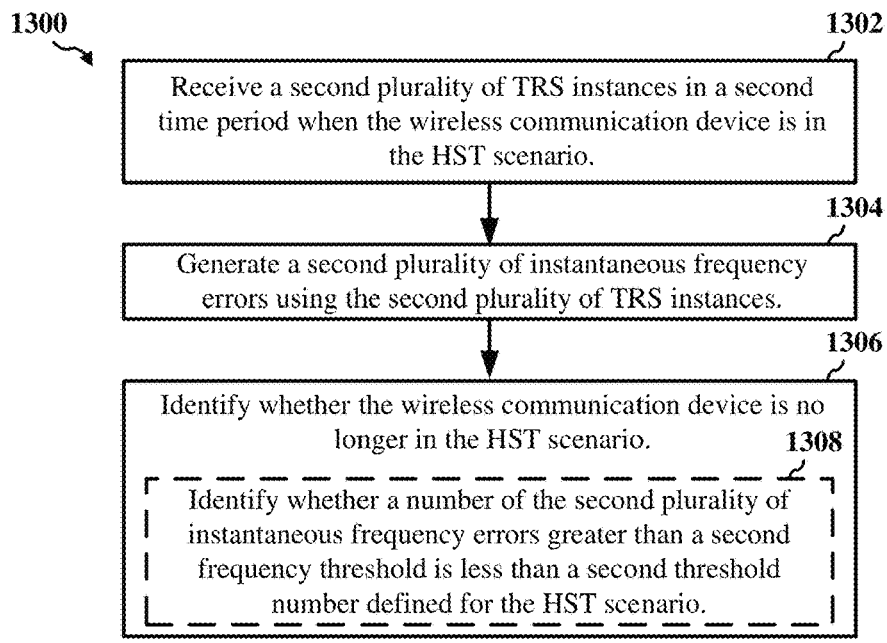
FIG. 13 shows a flowchart depicting an example operation for identifying whether a wireless communication device is still in a HST scenario based on a number of instantaneous frequency errors.

FIG. 13 shows a flowchart depicting an example operation 1300 for identifying whether a wireless communication device is still in a HST scenario based on a number of instantaneous frequency errors. The operation 1300 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 1300 may be performed in addition to operation 1100 in FIG. 11.

At 1302, the wireless communication device receives a second plurality of TRS instances in a second time period when the wireless communication device is in the HST scenario. At 1304, the wireless communication device generates a second plurality of instantaneous frequency errors using the second plurality of TRS instances. In some implementations, the second time period may include an amount of time preceding the present. In this manner, the second time period may be a moving window. In some implementations, the second time period may include a defined number of previously generated instantaneous frequency errors. In this manner, the second time period may include a rolling number of the last generated instantaneous frequency errors.

At 1306, the wireless communication device identifies whether the wireless communication device is no longer in the HST scenario. In some implementations of identifying whether the wireless communication device is no longer in the HST scenario, the wireless communication device identifies whether a number of the second plurality of instantaneous frequency errors greater than a second frequency threshold is less than a second threshold number defined for the HST scenario (1308). As noted above, whether the wireless communication device remains in the HST scenario may be based on whether the instantaneous frequency errors generated during the second time period are above a second frequency threshold. In this manner, if the instantaneous frequency errors remain below the second frequency threshold as time passes from one or more prior instantaneous frequency errors being greater than the second frequency threshold, the wireless communication device identifies that the wireless communication device is no longer in the HST scenario. The second frequency threshold may be associated with whether the wireless communication device is still switching between repeaters of a BS to cause jumps in the instantaneous frequency error (such as depicted in FIG. 9).

Figure 14:
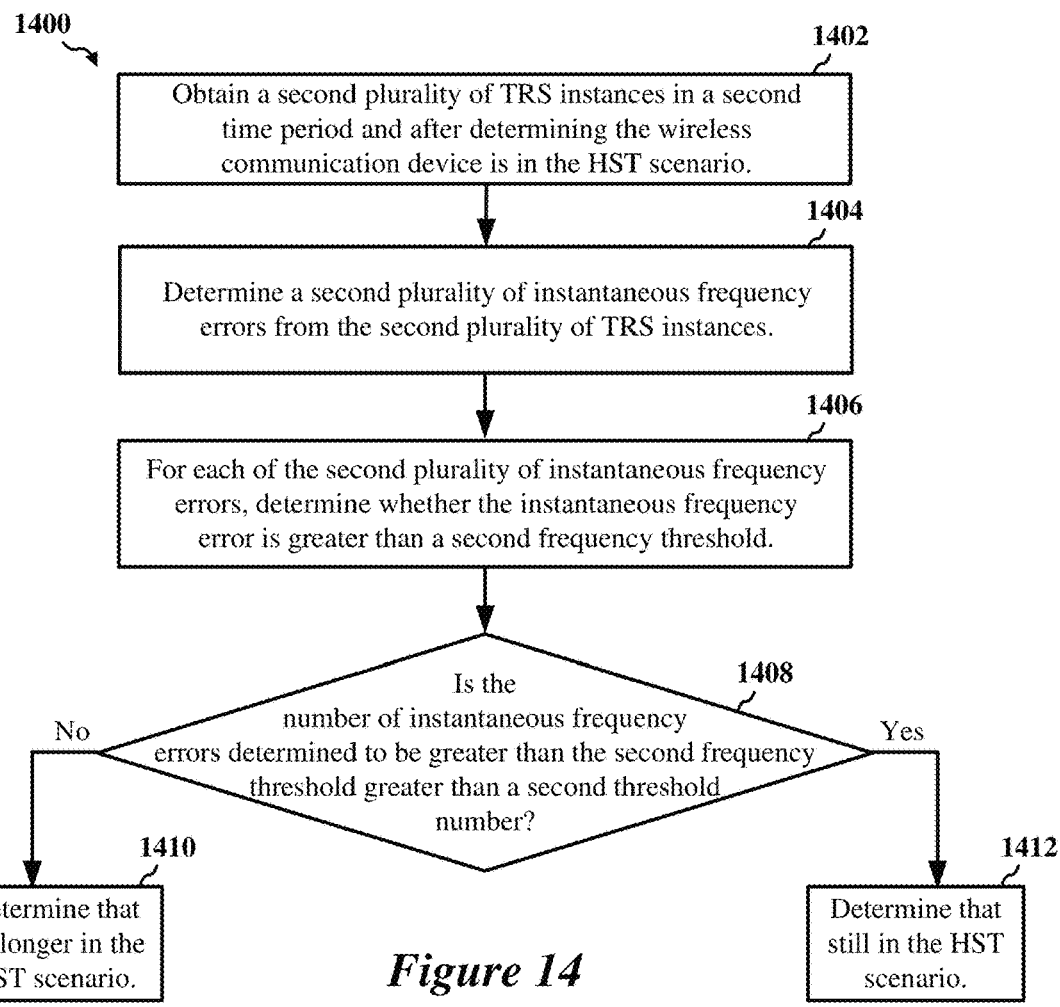
FIG. 14 shows a flowchart depicting another example operation for identifying whether a wireless communication device is still in a HST scenario based on a number of instantaneous frequency errors.

FIG. 14 shows a flowchart depicting another example operation 1400 for identifying whether a wireless communication device is still in a HST scenario based on a number of instantaneous frequency errors. The operation 1400 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 1400 may be an example implementation of operation 1300 in FIG. 13. To note, the example operation 1400 may be similar to the example operation 1200 in FIG. 12.

At 1402, the wireless communication device obtains a second plurality of TRS instances in a second time period and after determining the wireless communication device is in the HST scenario. At 1404, the wireless communication device determines a second plurality of instantaneous frequency errors from the second plurality of TRS instances. At 1406, the wireless communication device determines, for each of the second plurality of instantaneous frequency errors, whether the instantaneous frequency error is greater than a second frequency threshold. At decision block 1408, the wireless communication device determines whether the number of instantaneous frequency errors determined to be greater than the second frequency threshold is greater than a second threshold number. If the number is not greater than the second threshold number, the wireless communication device identifies that the wireless communication device is no longer in the HST scenario (1410). In this manner, the wireless communication device may be configured to use SSBs obtained during CDRx for tracking. In some implementations, the wireless communication device may prevent listening for the TRS during CDRx. If the number is greater than the second threshold number, the wireless communication device identifies that the wireless communication device is still in the HST scenario (1412). In this manner, the wireless communication device is still configured to listen for the TRS (thus obtaining TRS instances) during CDRx.

One or more of the second time period, the second frequency threshold, or the second threshold number for example operation 1400 may be the same as (or different than) the time period, the frequency threshold, or the threshold number used in example operation 1200 in FIG. 12. In this manner, identifying when entering the HST scenario may have the same or different constraints than identifying when exiting the HST scenario. "Time periods" as used herein may refer to a moving window of time, overlapping or non-overlapping time blocks, or any other suitable measure of time. In this manner, determining whether the wireless communication device is in the HST scenario or determining whether the wireless communication device is still in the HST scenario may be based on frequency errors determined during a moving time window, during a fixed block of time, or during any other suitable measure of a time period. As noted above, the parameters may be any suitable parameters, and the present disclosure is not limited to a specific time period length, a specific frequency threshold, or a specific threshold number.

As noted in the example implementations above, identifying whether a wireless communication device is in a HST scenario may be based on one or more instantaneous frequency errors generated by the wireless communication device. In some implementations alternative to or in addition to the above example implementations, identifying whether the wireless communication device is in a HST scenario may be based on a comparison of frequency errors generated using received SSBs and frequency errors generated using received TRS instances. For example, the wireless communication device may receive SSBs over time and instances of the TRS over time. The wireless communication device may generate a first sequence of frequency errors using the SSBs and a second sequence of frequency errors using the TRS instances, and the UE may compare the first sequence of frequency errors to the second sequence of frequency errors. A divergence between the first sequence and the second sequence (such as an increased difference between a frequency error generated based on a SSB and a frequency error generated based on a TRS instance corresponding to the SSB) may indicate that the UE is in a HST scenario.

Figure 15:
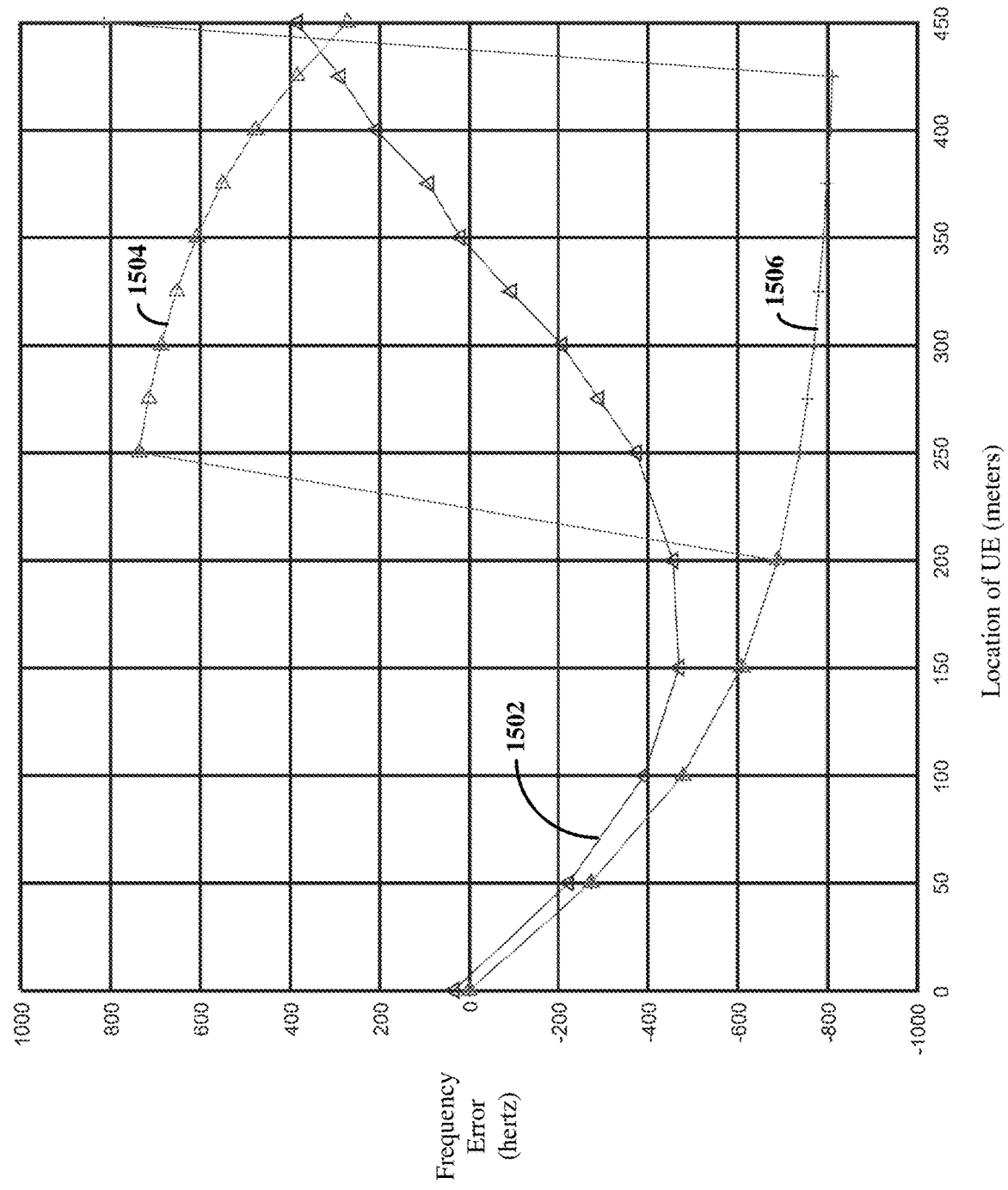
FIG. 15 shows a depiction of example frequency errors determined using synchronization signal blocks and example frequency errors determined using tracking reference signals from different repeaters.

FIG. 15 shows a depiction 1500 of example frequency errors determined using SSBs and example frequency errors generated using TRSs from different repeaters. The SSBs and TRS instances are illustrated in the example as obtained at different UE locations as the UE is measured in the depiction as moving from left to right. For example, the UE starts at a location indicated by 0 meters along the horizontal axis and moves 450 meters. In the example, the UE is moving at a high speed (such as greater than 200 kilometers per hour (kph)).

The depiction 1500 includes three groups of frequency errors 1502-1506. Each group of frequency errors includes a frequency error generated periodically during the UE movement (such as every 50 meters or 25 meters of UE movement or at defined time intervals). Group 1502 includes frequency errors determined using obtained SSBs from a first repeater or a second repeater (with the UE switching from the first repeater to the second repeater for obtaining SSBs at 350 meters). Group 1504 and group 1506 include frequency errors generated using obtained TRS instances from the first repeater or the second repeater.

Neighboring frequency errors of each group 1502-1506 in the depiction 1500 are connected via a line to illustrate the next frequency error generated for each group. In this manner, group 1502 is illustrated as a first curve, group 1504 is illustrated as a second curve, and group 1506 is illustrated as a third curve.

The second repeater's location for group 1504 may differ from the second repeater's location for group 1506. As a result, the UE switches from the first repeater to the second repeater for listening to the TRS at different locations for group 1504 and for group 1506. In the example, the UE switches repeaters for listening to the TRS at 250 meters for group 1504, or the UE switches repeaters at 450 meters for listening to the TRS for group 1506. As a result, the second curve and the third curve are similar (with the frequency errors of groups 1504 and 1506) until the UE is 250 meters from the starting point in depiction 1500. In some other implementations, the difference in switching points may be based on different delays in switching (such as based on delays in configuring the TCI state, fading, and so on).

The UE listens for (i) the SSBs and (ii) the TRS. In this manner, the UE obtains the SSBs for group 1502 and also obtains either the TRS instances for group 1504 or the TRS instances for group 1506. As noted above, the UE may switch between repeaters for listening for SSBs at a different point than switching between the repeaters for listening for the TRS (such as at 350 meters for the SSBs versus 250 meters or 450 meters for the TRS in depiction 1500).

For example, the UE's location may be between the first repeater and the second repeater, and the UE may be in both coverage areas for the first repeater and the second repeater. When the UE is in both coverage areas, the UE is able to obtain a signal (including the SSBs) from both repeaters. In listening for SSBs, the UE may be configured to listen for the SSBs from the repeater's signal with the highest RSRP (which may be assumed to indicate the closest repeater). In this manner, the UE uses one or more SSBs from the strongest signal at the moment to generate a frequency error.

In listening for the TRS, the UE switching repeaters for listening for the TRS is based on a TCI state switch (as noted above). When to switch between repeaters for listening for the TRS may be impacted by one or more factors, such as fading or delays in switching TCI states. As a result, the point at which the UE switches repeaters for obtaining TRS instances may differ from the point at which the UE switches repeaters for obtaining the SSBs.

With the UE obtaining SSBs and TRS instances, the UE determines at least two groups of frequency errors in the depiction 1500 (such as groups 1502 and 1504 or groups 1502 and 1506). As illustrated, the UE switching repeaters for SSBs may occur before or after switching repeaters for the TRS. In some implementations, the UE determines a frequency error using the TRS that corresponds to a frequency error determined using the SSBs (such as based on the UE location or time when obtaining the TRS instance and the SSB). In this manner, the UE determines associated pairs of frequency errors (based on the UE location where or the time when the SSB and the TRS instance are obtained) for the two groups of frequency errors.

The UE switching between repeaters at a first time for listening for SSBs that is different than a second time for listening for the TRS may cause a divergence between the frequency errors generated using the SSBs and the frequency errors generated using the TRS. For example, if the UE generates the frequency errors of group 1502 and the frequency errors of group 1504, the magnitude of the difference between the corresponding pair of frequency errors at 250 meters (at which the UE switches to the second repeater for obtaining TRS instances) increases from approximately 250 Hz (at 200 meters) to approximately 1500 Hz (at 250 meters). In another example, if the UE generates the frequency errors of group 1502 and the frequency errors of group 1506, the magnitude of the difference between the corresponding pairs of frequency errors continues to increase from approximately 200 Hz (at 200 meters) to approximately 1000 Hz (at 400 meters).

In some implementations, the difference between corresponding frequency errors (also referred to as a frequency error difference) may be used to identify whether the wireless communication device is in a HST scenario. As used herein, the frequency error difference may refer to a magnitude of the difference between a frequency error generated using a SSB and a corresponding frequency error generated using a TRS instance corresponding to the SSB. For example, for groups of frequency errors 1502 and 1506 determined by the UE, a frequency error difference at 200 meters may be approximately 200 Hz (absolute value of −450 Hz minus −650 Hz), a frequency error difference at 250 meters may be approximately 400 Hz (absolute value of −350 Hz minus −750 Hz), a frequency error difference at 300 meters may be approximately 550 Hz (absolute value of −200 Hz minus −750 Hz), and so on. While an example of generating a frequency error difference is provided, the frequency error difference may be generated in any suitable manner (such as a difference between an average of a first group of frequency errors and one or more of a second group of frequency errors, using a median of frequency errors in determining a difference, determining when a curve for one group of frequency errors crosses over the curve for the other group of frequency errors, and so on). In determining that the wireless communication device is in the HST scenario, the wireless communication device periodically may determine a frequency error difference and determine if the frequency error difference is greater than a frequency threshold. The frequency error difference being greater than the frequency threshold may indicate that the wireless communication device is in a HST scenario.

Figure 16:
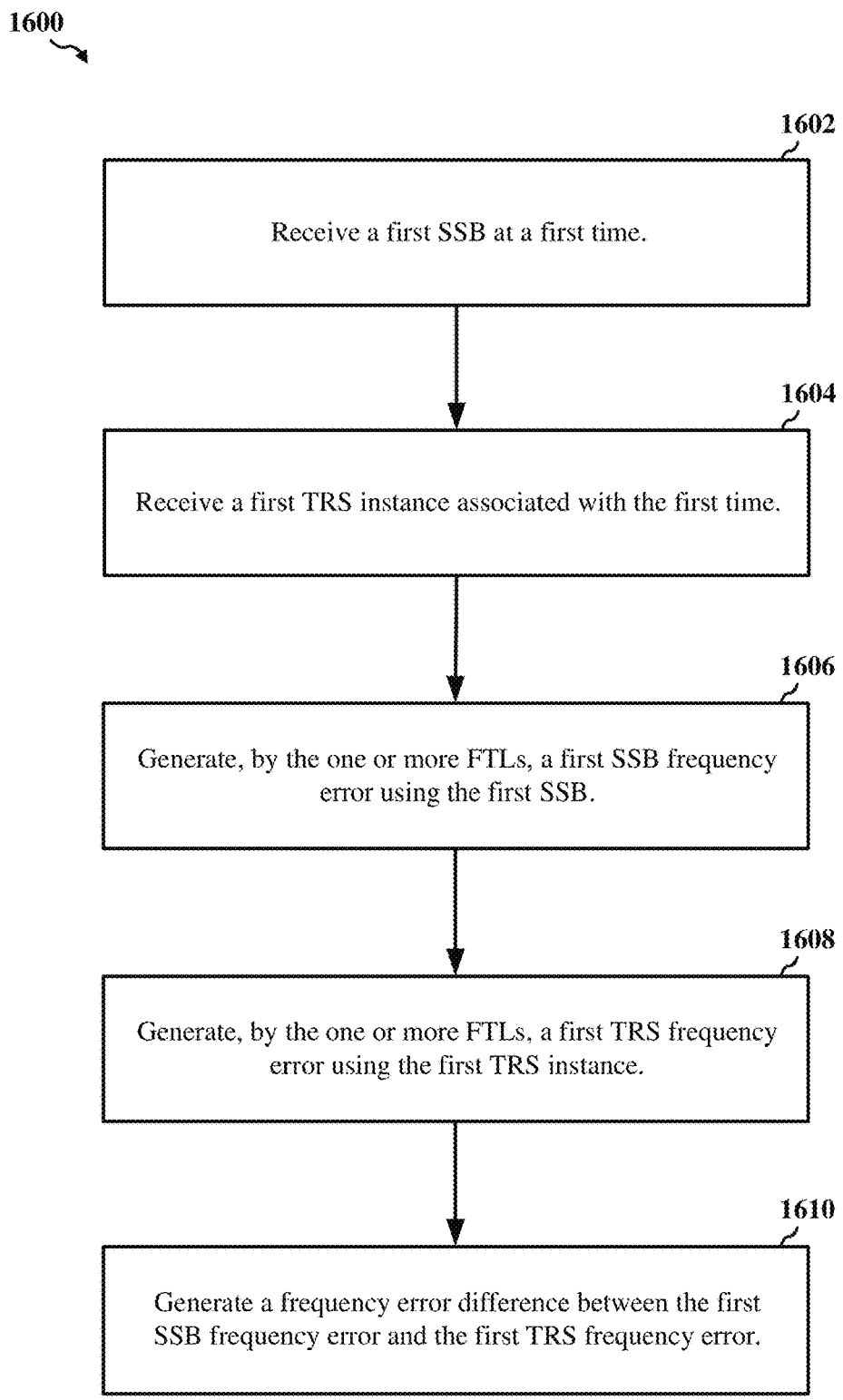
FIG. 16 shows a flowchart depicting an example operation for identifying whether a wireless communication device is in a HST scenario based on a frequency error difference.

FIG. 16 shows a flowchart depicting an example operation 1600 for identifying whether a wireless communication device is in a HST scenario based on a frequency error difference. The operation 1600 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 1600 may be performed in addition to operation 600 in FIG. 6.

At 1602, the wireless communication device receives a first SSB at a first time. In some implementations, the first time is while the wireless communication device is active (such as before the wireless communication device identifies that the wireless communication device is in a HST scenario). At 1604, the wireless communication device receives a first TRS instance associated with the first time. For example, the wireless communication device may obtain the first TRS instance at approximately the same time as the SSB. In some implementations of step 1604, "at approximately the same time" may refer to the TRS instance (from multiple TRS instances) obtained at the time closest to when the SSB is obtained. The SSB and the TRS instance may be from the same repeater or from different repeaters. For example, the SSB may be from the repeater associated with the strongest signal as received by the wireless communication device, and the TRS instance may be from the repeater associated with the current TCI state used by the wireless communication device for listening for the TRS. The strongest signal and the TCI state may be associated with the same repeater, or the strongest signal may be associated with one repeater while the TCI state is associated with a different repeater.

At 1606, the wireless communication device generates, by the one or more FTLs, a frequency error using the first SSB (which may be referred to as a first SSB frequency error). At 1608, the wireless communication device generates, by the one or more FTLs, a frequency error using the first TRS instance (which may be referred to as a first TRS frequency error). Determining each frequency error may be as described above. At 1610, the wireless communication device generates a frequency error difference between the first SSB frequency error and the first TRS frequency error. In an example implementation of step 602 of operation 600 in FIG. 6, the wireless communication device may use the frequency error difference to determine whether the wireless communication device is in the HST scenario.

In some implementations, the wireless communication device identifying whether the wireless communication device is in the HST scenario includes identifying whether the frequency error difference is greater than a frequency threshold. If the wireless communication device uses only one frequency error difference to identify whether the wireless communication device is in the HST scenario, the frequency error difference being greater than the frequency threshold may indicate that the wireless communication device is in the HST scenario. Similar to the frequency threshold in FIGS. 11-14 for instantaneous frequency errors, any suitable frequency threshold may be used to attempt to indicate that the wireless communication device is in a HST scenario. For example, the frequency threshold may be 400 Hz, 600 Hz, or any other suitable number for the frequency error difference. The frequency threshold may be static or dynamic, or the frequency threshold may be set or adjusted by a device manufacturer, software, firmware, a user, based on prior use or frequency error measurements, and so on.

Similar to as described above with reference to FIGS. 11 and 12 for instantaneous frequency errors, the wireless communication device may determine how many frequency error differences generated by the wireless communication device over a time period are greater than the frequency threshold. The number of frequency error differences greater than the frequency threshold may indicate the number of repeater switches during the time period. If the number of frequency error differences greater than the frequency threshold during the time period is greater than a threshold number, the wireless communication device may identify that the wireless communication device is in a HST scenario. If the number is not greater than the threshold number, the wireless communication device may identify that the wireless communication device is not in a HST scenario.

Figure 17:
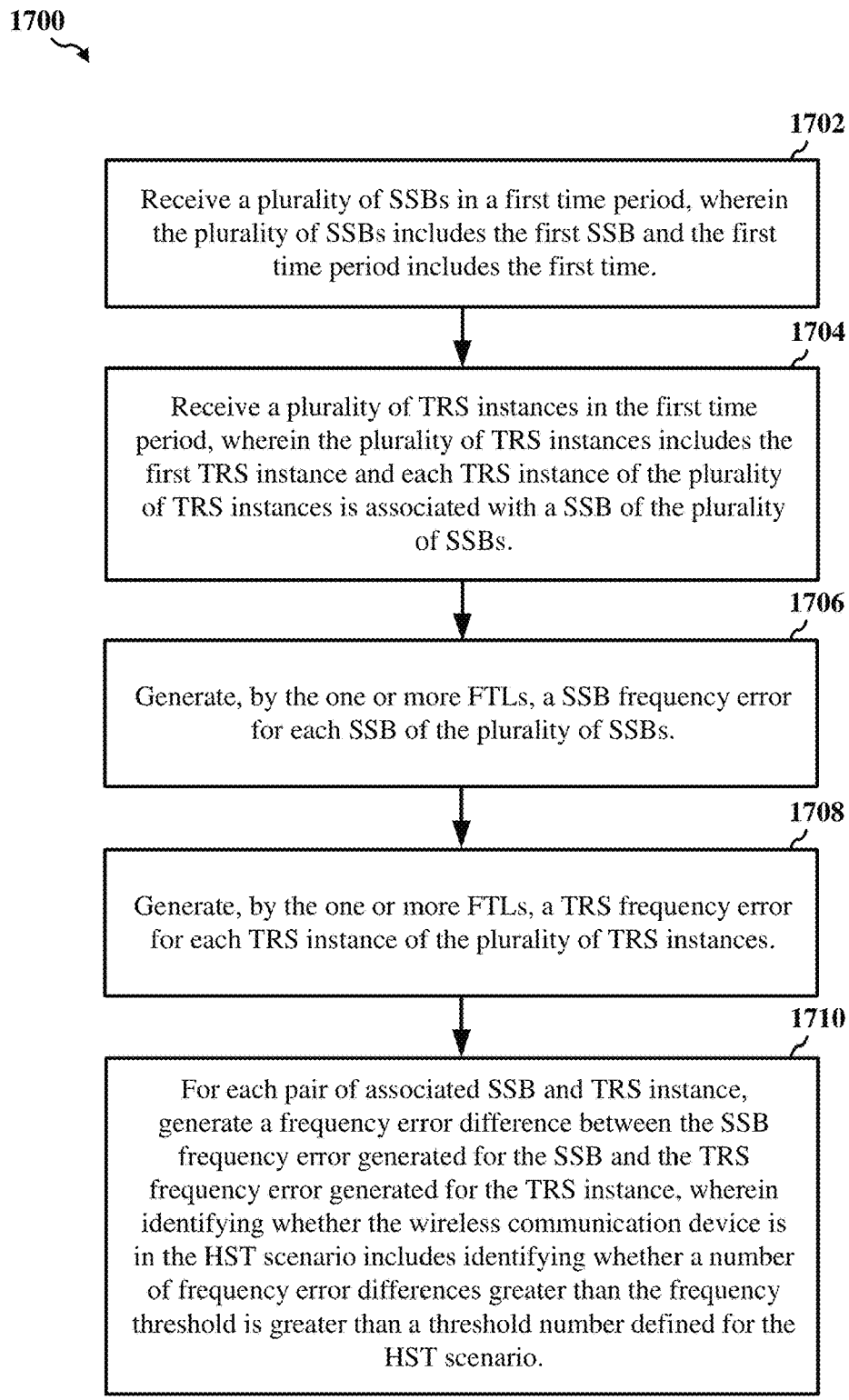
FIG. 17 shows a flowchart depicting an example operation for identifying whether a wireless communication device is in a HST scenario based on a number of frequency error differences.

FIG. 17 shows a flowchart depicting an example operation 1700 for identifying whether a wireless communication device is in a HST scenario based on a number of frequency error differences. The operation 1700 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 1700 may be performed in addition to operation 1600 in FIG. 16.

At 1702, the wireless communication device receives a plurality of SSBs in a first time period. Referring back to FIG. 16, the plurality of SSBs includes the first SSB and the first time period includes the first time from step 1602. For example, the wireless communication device may listen for and receive the SSBs periodically transmitted by one or more repeaters or a BS. At 1704, the wireless communication device also receives a plurality of TRS instances in the first time period. Referring back to FIG. 16, the plurality of TRS instances includes the first TRS instance from step 1604. In addition, each TRS instance of the plurality of TRS instances is associated with a SSB of the plurality of SSBs. For example, a TRS instance associated with a SSB may be the TRS instance obtained closest in time to obtaining the SSB by the wireless communication device. In this manner, a plurality of pairs of an associated SSB and TRS instance exist. In some implementations, the number of TRS instances may equal the number of SSBs obtained so that the number of pairs of associated SSB and TRS instance equals the number of SSBs. In some implementations, the number of TRS instances may be less than the number of SSBs obtained. For example, the wireless communication device may receive SSBs from multiple repeaters while receiving TRS instances from only one repeater. In this manner, the pairs of associated SSB and TRS instance may not include all of the SSBs received during the first time period. In some implementations, the plurality of SSBs may be a portion of all of the SSBs obtained during the first time period, with each SSB of the plurality of SSBs being associated with an obtained TRS instance.

At 1706, the wireless communication device generates, by the one or more FTLs, a SSB frequency error for each SSB of the plurality of SSBs. At 1708, the wireless communication device generates, by the one or more FTLs, a TRS frequency error for each TRS instance of the plurality of TRS instances. At 1710, the wireless communication device generates a frequency error difference for each pair of associated SSB and TRS instance, with the frequency error difference being between the SSB frequency error generated for the SSB (1706) and the TRS frequency error generated for the TRS instance (1708). Referring back to FIG. 6, identifying whether the wireless communication device is in the HST scenario may include identifying whether a number of frequency error differences greater than the frequency threshold is greater than a threshold number defined for the HST scenario. For example, referring back to FIG. 15, if the threshold number is 3, group 1502 indicates the SSB frequency errors generated from the received SSBs, and group 1504 indicates the TRS frequency errors generated from the received TRS instances, a repeater switch causes the crossover event between the lines for groups 1502 and 1504 at the 250 m location of the UE. In this manner, the next associated pair of SSB and TRS instance after the switch is associated with a frequency error difference that is greater than the frequency threshold (thus indicating the switch). The number of frequency error differences greater than the frequency threshold being more than 3 during a time period may indicate more than 3 switches between repeaters or BSs during the time period. In this manner, the threshold number may be used to differentiate a wireless communication device moving for a HST scenario and other movements not associated with a HST scenario.

Figure 18:
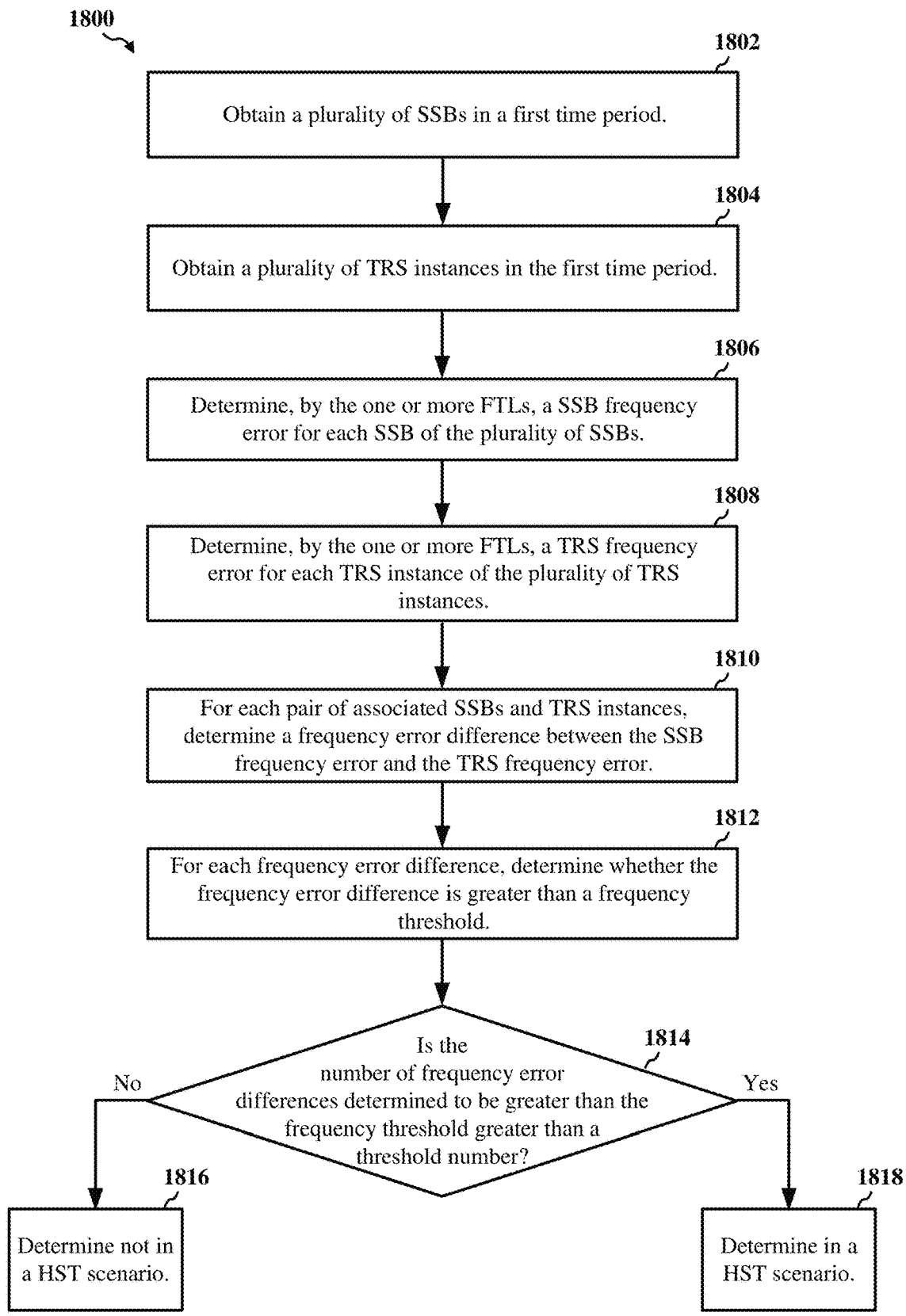
FIG. 18 shows a flowchart depicting another example operation for identifying whether a wireless communication device is in a HST scenario based on a number of frequency error differences.

FIG. 18 shows a flowchart depicting another example operation 1800 for identifying whether a wireless communication device is in a HST scenario based on a number of frequency error differences. The operation 1800 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5).

In some implementations, the operation 1800 may be an example implementation of operation 1700 in FIG. 17.

At 1802, the wireless communication device obtains a plurality of SSBs in a first time period. In some implementations, the plurality of SSBs may include the first SSB. At 1804, the wireless communication device also obtains a plurality of TRS instances in the first time period. In some implementations, the plurality of TRS instances may include the first TRS instance. Each TRS instance of the plurality of TRS instances may be associated with a SSB of the plurality of SSBs.

At 1806, the wireless communication device determines, by the one or more FTLs, a SSB frequency error for each SSB of the plurality of SSBs. At 1808, the wireless communication device determines, by the one or more FTLs, a TRS frequency error for each TRS instance of the plurality of TRS instances. Determining each frequency error may be as described above. With each TRS instance associated with a SSB, each TRS frequency error is associated with a SSB frequency error. At 1810, the wireless communication device determines, for each pair of associated SSBs and TRS instances, a frequency error difference between the SSB frequency error and the TRS frequency error. In this manner, the wireless communication device may determine a sequence of frequency error differences over time. For example, referring back to FIG. 15, a length of the time period may correspond to the UE moving 450 meters (as in depiction 1500), and the wireless communication device may determine a sequence of instantaneous frequency errors from the corresponding SSB frequency errors and TRS frequency errors for the time period.

Referring back to FIG. 18, at 1808, the wireless communication device determines, for each frequency error difference, whether the frequency error difference is greater than a frequency threshold. For example, referring back to FIG. 15, the UE may determine whether each frequency error difference determined for the UE moving 450 meters is greater than the frequency threshold. For example, each time a frequency error difference is determined over time, the frequency error difference is compared to the frequency threshold.

At decision block 1814, the wireless communication device may determine whether the number of frequency error differences determined to be greater than the frequency threshold is greater than a threshold number (such as described above). If the number is not greater than the threshold number, the wireless communication device may determine that the wireless communication device is not in a HST scenario (1816). In some implementations, if the number is not greater than the threshold number, the wireless communication device is configured to use SSBs obtained during CDRx to generate a frequency error and determine a communication frequency (instead of using the TRS). In this manner, the wireless communication device may prevent listening for the TRS during CDRx (such as allowing the wireless communication device to remain in a low power state longer during a DRx cycle).

Referring back to decision block 1814, if the number is greater than the threshold number, the wireless communication device may determine that the wireless communication device is in the HST scenario (1818). In some implementations, if the number is greater than the threshold number, the wireless communication device is configured to listen for the TRS and obtain instances of the TRS during CDRx to generate a frequency error and determine a communication frequency (instead of using the SSBs obtained).

In a specific example of operation 1800, the frequency threshold may be 600 Hz, the threshold number may be one, and the time period may be five seconds. In this manner, the parameters may be configured so that the wireless communication device attempts to determine that switches repeaters two or more times during a five second period to identify that the wireless communication device is in a HST scenario. However, as noted herein, any suitable parameters may be used to identify that the wireless communication device is in a HST scenario (or otherwise is to listen for a TRS during CDRx). For example, any suitable time period, frequency threshold, or threshold number may be used in identifying whether the wireless communication device is to listen for the TRS during CDRx.

With the wireless communication device identified as being in a HST scenario, the wireless communication device is configured to obtain TRS instances no matter whether the UE is in an active state or the UE is in an idle state (such as during CDRx). As such, the UE may continue to determine frequency error differences and whether each frequency error difference is greater than a threshold. The comparisons of the frequency error differences to a threshold may be used to determine whether the wireless communication device remains in the HST scenario as time passes.

In some implementations, the wireless communication device remains configured to listen for TRS during CDRx (referred to as the wireless communication device still in the HST scenario) as long as one or more frequency error differences remain above a frequency threshold over time. For example, once the wireless communication device is configured to listen for TRS during CDRx with the wireless communication device being in a HST scenario, the wireless communication device may determine whether a number of frequency error differences greater than a second frequency threshold over a second period of time is greater than a second threshold number.

Referring back to FIG. 15 for a specific example, if the UE is already determined to be in a HST scenario before the UE begins moving from 0 to 450 meters in the depiction 1500, it may be determined whether the UE is still in the HST scenario based on determining that a number of frequency error differences being greater than a second frequency threshold is above a second threshold number. The second frequency threshold used in determining whether the UE is still in the HST scenario may be the same or different than the above described frequency threshold used in determining whether the UE is in the HST scenario. The second threshold number used in determining whether the UE is still in the HST scenario may be the same or different than the above described threshold number used in determining whether the UE is in the HST scenario. The second time period used in determining whether the UE is still in the HST scenario may be the same or different than the above described time period used in determining whether the UE is in the HST scenario. For example, the second threshold number (used to determine whether the UE is still in the HST scenario) may be less than the threshold number previously used to determine that the UE is in the HST scenario. In this manner, remaining in the HST scenario (and thus being configured to listen for a TRS during CDRx) may be easier than first determining that the UE is in the HST scenario. In another example, the second threshold number may be the same as the threshold number previously used. In another example, the second time period used in determining whether the UE is still in a HST scenario may be longer than the time period used originally in determining whether the UE is in a HST scenario. In this manner, the second time period may be a sufficient length to compensate for possible stops and pauses in the UE moving. For example, the second time period may be of a sufficient length to accommodate a HST stopping at a station or briefly slowing down (such as for construction, emergency conditions, for passenger embarkation and disembarkation, and so on).

In some implementations, if all parameters are the same in determining whether the wireless communication device is still in the HST scenario as in first determining that the wireless communication device is in the HST scenario, the operation for determining whether the UE is still in the HST scenario may be the same as example operation 1700 in FIG. 17 or example operation 1800 in FIG. 18. To note, some of the steps for determining whether the wireless communication device is still in the HST scenario may be similar to as described above with reference to FIG. 13 or FIG. 14 for instantaneous frequency errors.

Figure 19:
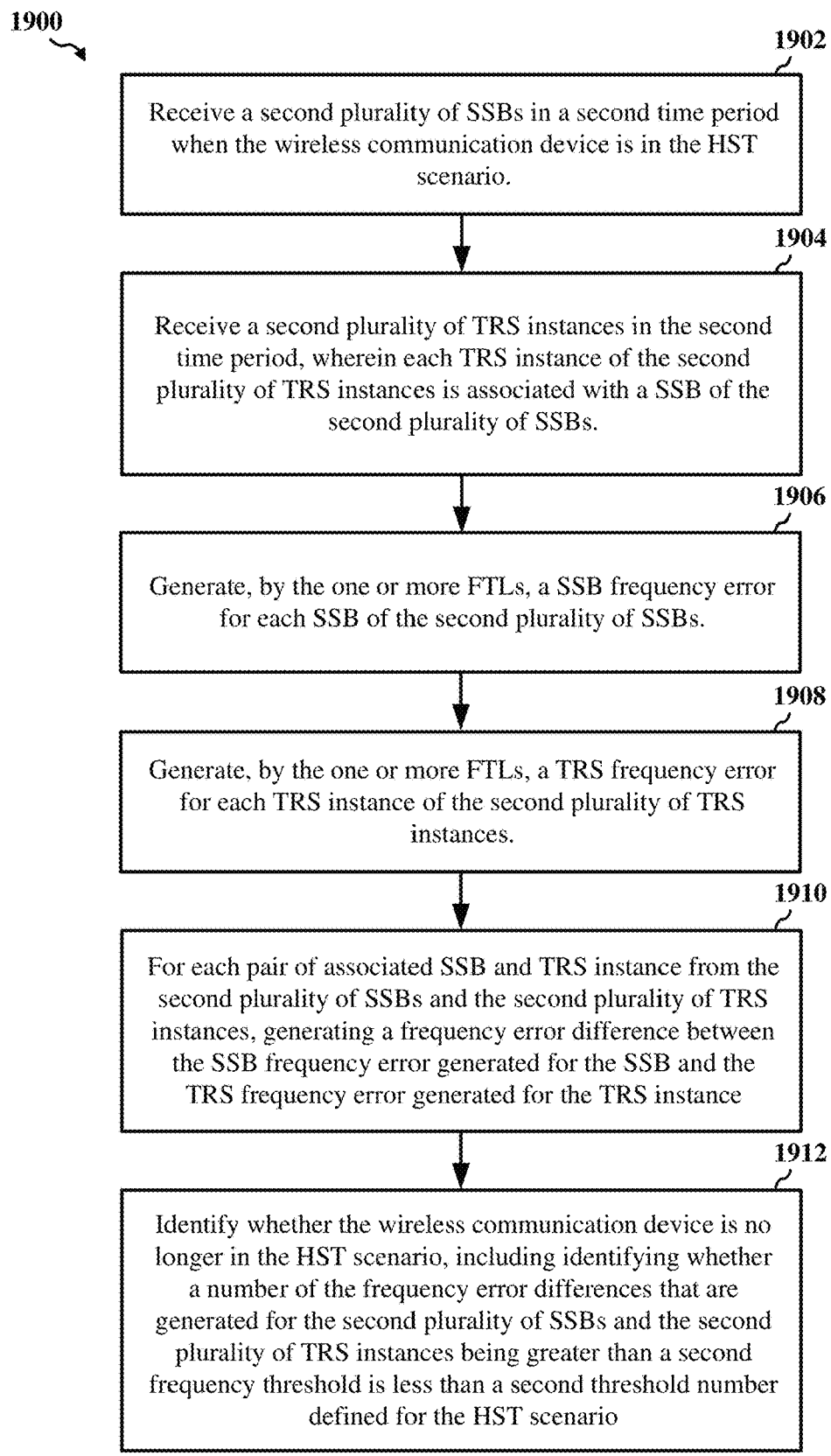
FIG. 19 shows a flowchart depicting an example operation for identifying whether a wireless communication device is still in a HST scenario based on a number of frequency error differences.

FIG. 19 shows a flowchart depicting an example operation 1900 for identifying whether a wireless communication device is still in a HST scenario based on a number of frequency error differences. The operation 1900 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 1900 may be performed in addition to operation 1700 in FIG. 17 or operation 1800 in FIG. 18. To note, the example operation 1900 may be similar to the example operation 1700 in FIG. 17 for identifying when the wireless communication device initially is in the HST scenario.

At 1902, the wireless communication device receives a second plurality of SSBs in a second time period when the wireless communication device is in the HST scenario. At 1904, the wireless communication device also receives a second plurality of TRS instances in the second time period. Each TRS instance of the second plurality of TRS instances is associated with a SSB of the second plurality of SSBs. At 1906, the wireless communication device generates, by the one or more FTLs, a SSB frequency error for each SSB of the second plurality of SSBs. At 1908, the wireless communication device also generates, by the one or more FTLs, a TRS frequency error for each TRS instance of the second plurality of TRS instances. At 1910, the wireless communication device generate a frequency error difference between the SSB frequency error generated for an SSB and the TRS frequency error generated for a TRS instance for each pair of associated SSB and TRS instance from the second plurality of SSBs and the second plurality of TRS instances.

At 1912, the wireless communication device identifies whether the wireless communication device is no longer in the HST scenario. Identifying whether the wireless communication device is no longer in the HST scenario includes identifying whether a number of the frequency error differences that are generated for the second plurality of SSBs and the second plurality of TRS instances being greater than a second frequency threshold is less than a second threshold number defined for the HST scenario (such as similar for step 1710 in FIG. 17).

Figure 20:
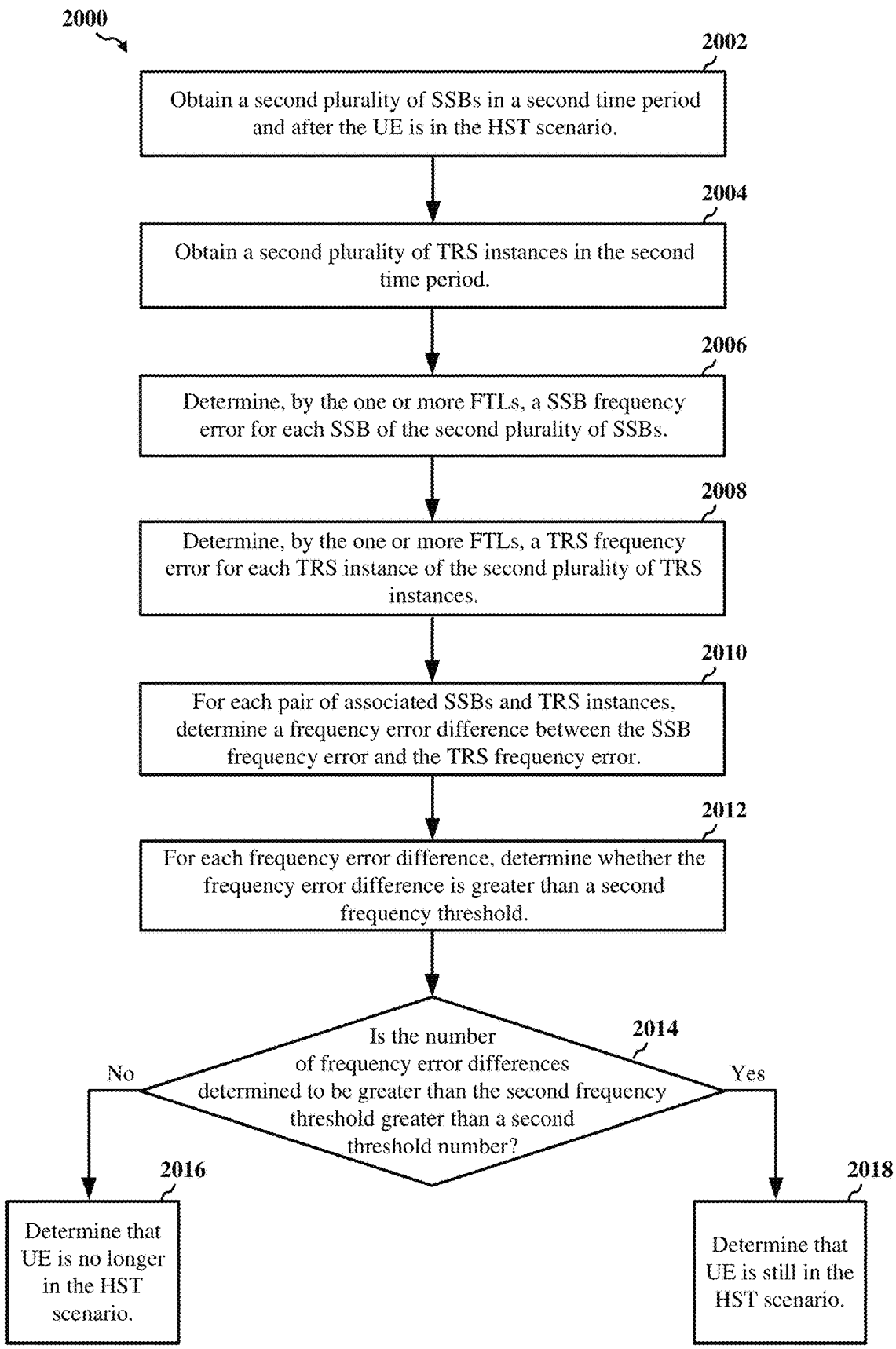
FIG. 20 shows a flowchart depicting another example operation for identifying whether a wireless communication device is still in a HST scenario based on a number of frequency error differences.

FIG. 20 shows a flowchart depicting another example operation 2000 for identifying whether a wireless communication device is still in a HST scenario based on a number of frequency error differences. The operation 2000 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the operation 2000 is an example implementation of operation 1900 in FIG. 19. To note, the example operation 2000 may be similar to the example operation 1800 in FIG. 18 for identifying when the wireless communication device initially is in the HST scenario.

At 2002, the wireless communication device obtains a second plurality of SSBs in a second time period and after determining the wireless communication device is in the HST scenario. At 2004, the wireless communication device obtains a second plurality of TRS instances in the second time period. Similar to step 1804 in FIG. 18, each TRS instance of the second plurality of TRS instances is associated with a SSB of the second plurality of SSBs. At 2006, the wireless communication device determines, by the one or more FTLs, a SSB frequency error for each SSB of the second plurality of SSBs. At 2008, the wireless communication device also determines, by the one or more FTLs, a TRS frequency error for each TRS instance of the second plurality of TRS instances. Since each TRS instance is associated with a SSB, each TRS frequency error is associated with a SSB frequency error.

At 2010, the wireless communication device determines, for each pair of associated SSBs and TRS instances, a frequency error difference between the SSB frequency error and the TRS frequency error. At 2012, the wireless communication device determines, for each frequency error difference, whether the frequency error difference is greater than a second frequency threshold.

At decision block 2014, the wireless communication device determines whether the number of frequency error differences determined to be greater than the second frequency threshold is greater than a second threshold number. If the number is not greater than the second threshold number, the wireless communication device identifies that the wireless communication device is no longer in the HST scenario (2016). In this manner, the wireless communication device may revert back to using SSBs obtained during CDRx for tracking. In some implementations, the wireless communication device may prevent listening for the TRS during CDRx when the wireless communication device is no longer in the HST scenario. If the number is greater than the second threshold number, the wireless communication device identifies that the wireless communication device is still in the HST scenario (2018). In this manner, the wireless communication device is still configured to listen for the TRS during CDRx.

As noted above, one or more of the second time period, the second frequency threshold, or the second threshold number used in example operation 1900 or example operation 2000 may be the same as (or different than) the time period, the frequency threshold, or the threshold number used in example operation 1700 in FIG. 17 of example operation 1800 in FIG. 18. In this manner, entering the HST scenario may have the same or different constraints than exiting the HST scenario. As noted above, "time periods" as used herein may refer to a moving window of time, overlapping or non-overlapping time blocks, or any other suitable measure of time. In this manner, determining whether the wireless communication device is in the HST scenario or determining whether the wireless communication device is still in the HST scenario may be based on frequency errors determined during a moving time window, during a fixed block of time, or during any other suitable measure of a time period. As noted above, the parameters may be any suitable parameters, and the present disclosure is not limited to a specific time period length, a specific frequency threshold, or a specific threshold number.

As described with reference to FIGS. 17-20, some implementations for determining whether the wireless communication device is to listen for the TRS during CDRx include identifying whether a number of frequency error differences greater than a frequency threshold over a period of time is greater than a threshold number. In general, though, identifying whether the wireless communication device is to listen for the TRS during CDRx (such as when the wireless communication device is in a HST scenario) may be based on whether the corresponding frequency errors diverge over time. As noted above with reference to FIG. 15, a divergence in frequency errors may be quick (such as illustrated by the large divergence in the lines associated with groups 1502 and 1504, for which switching repeaters for the SSB is after switching repeaters for the TRS). In some other instances, the divergence in frequency errors over time may be slower (such as illustrated by the slowly increasing divergence between the lines associated with groups 1502 and 1506, for which switching repeaters for the SSB is before switching repeaters for the TRS). In both instances above, the frequency errors diverge over time. The wireless communication device may measure the divergence over time (also referred to as a trajectory of the frequency error differences) using any suitable means to identify whether the wireless communication device is in the HST scenario. In some implementations, the wireless communication device may use any of the operations described above with reference to FIGS. 17-20 to determine a trajectory of the differences. In some implementations, the wireless communication device may determine a moving average of frequency error differences over time, determine a rate of increase in the frequency error differences over time, or use any other suitable means to measure the divergence in frequency errors.

Figure 21:
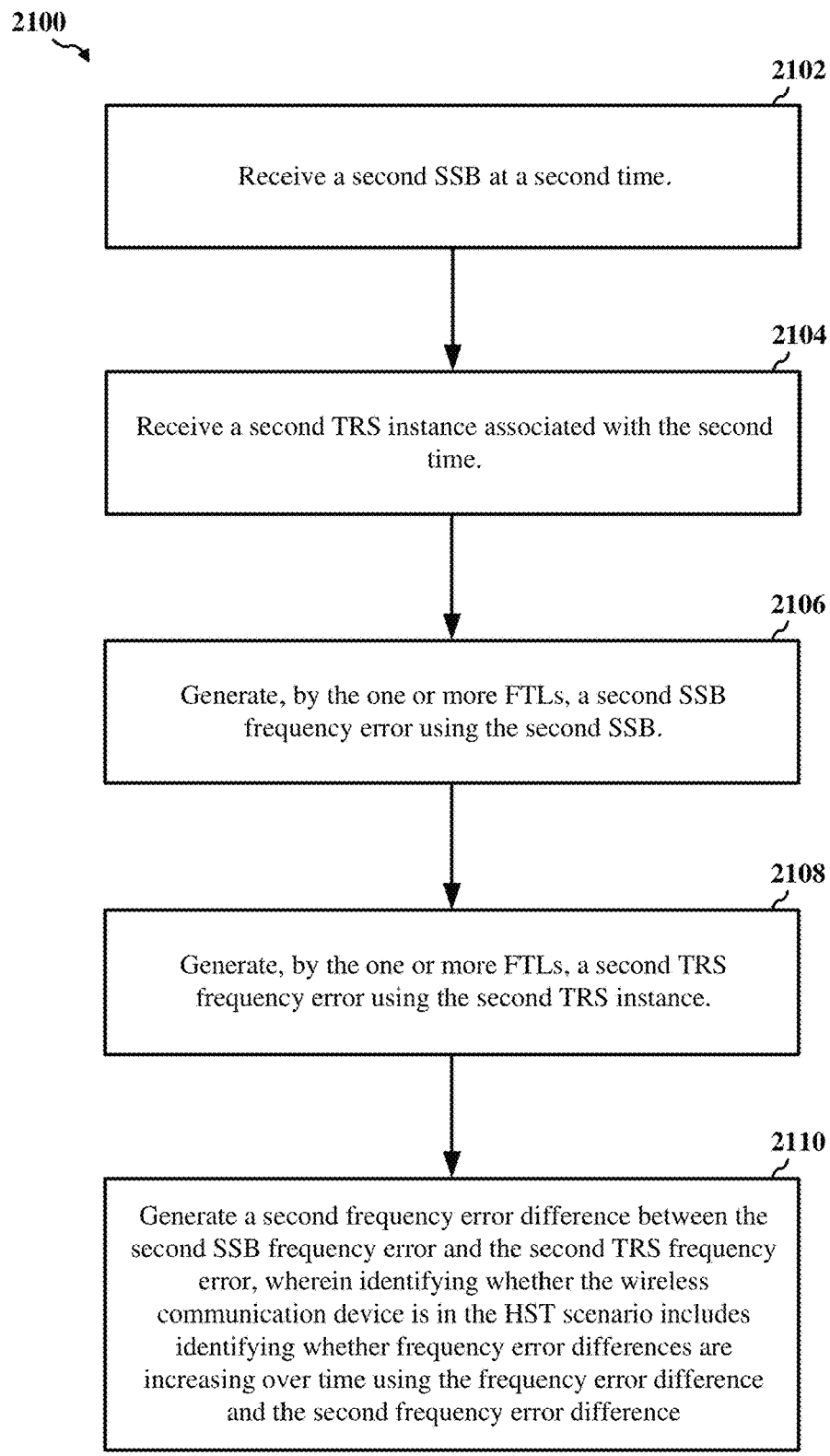
FIG. 21 shows a flowchart depicting an example operation for identifying whether a wireless communication device is in a HST scenario based on a divergence of frequency errors over time.

FIG. 21 shows a flowchart depicting an example operation 2100 for identifying whether a wireless communication device is in a HST scenario based on a divergence of frequency errors over time. The operation 2100 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In some implementations, the example operation 2100 may be in addition to the example operation 1600 in FIG. 16. As used herein, divergence of the frequency errors is described as an increase in frequency error differences over time, but divergence of the frequency errors and the increase in frequency error differences over time may refer to an increase in the differences reaching a threshold, the differences themselves reaching a threshold, or any other suitable means based on the frequency error differences to identify that the wireless communication device is in a HST scenario At 2102, the wireless communication device receives a second SSB at a second time. In some implementations, the second time is before the first time associated with the first SSB received in step 1602 of operation 1600 in FIG. 16. At 2104, the wireless communication device obtains a second TRS instance associated with the second time. At 2106, the wireless communication device generates, by the one or more FTLs, a second SSB frequency error using the second SSB. At 2108, the wireless communication device generates, by the one or more FTLs, a second TRS frequency error using the second TRS instance. At 2110, the wireless communication device generates a second frequency error difference between the second SSB frequency error and the second TRS frequency error. In this manner, the wireless communication device determines a second frequency error difference for frequency errors at a second time and a first frequency error difference for frequency errors at a first time (from operation 1600 in FIG. 16). Identifying whether the wireless communication device is in the HST scenario includes identifying whether frequency error differences are increasing over time using the frequency error difference and the second frequency error difference. For example, if the first time is after the second time, the wireless communication device may determine if the first frequency error difference is larger than the second frequency error difference or otherwise the frequency error difference increases over time. While operation 2100 (in combination with operation 1600) describes two frequency error differences being used by the wireless communication device in identifying whether the frequency error differences are increasing over time and whether the wireless communication device is in the HST scenario, any suitable number of frequency error differences may be used to measure a divergence of the frequency error differences over time (such as the frequency error difference increasing over an x number of differences).

The wireless communication device identifying when the wireless communication device is no longer in the HST scenario may be any suitable operations, such as any of the examples provided above to identify whether the wireless communication device is no longer in the HST scenario or being based on the frequency error differences converging over time or no longer diverges over time.

For the above described examples, each TRS instance obtained by the wireless communication device is not required to be used in determining a frequency error. Similarly, each SSB obtained by the wireless communication device is not required to be used in determining a frequency error. In this manner, the wireless communication device may obtain more SSBs or more TRS instances than used for determining instantaneous frequency errors or frequency error differences. In addition or to the alternative, while a frequency error is described as being generated using a SSB or a TRS instance, a FTL may receive multiple SSBs or multiple TRS instances over time for tracking.

The above examples for identifying whether the wireless communication device is in a HST scenario are described with reference to sequences of frequency errors determined by the wireless communication device. However, identifying whether the wireless communication device is in a HST scenario may be based on measurements other than frequency error determinations. As noted above, the wireless communication device determining whether to listen for the TRS during CDRx may be based on whether the UE is moving at a rate to cause switching between repeaters or a BS while travelling through a network's coverage area. A UE moving faster than a speed threshold or accelerating faster than an acceleration threshold may be associated with the UE being in a HST scenario, such as the UE being in being in a HST or in an automobile travelling along a highway, so that the UE is to listen for the TRS during CDRx.

The UE may include or be coupled to one or more sensors for determining a speed or an acceleration of the UE. For example, the UE may include an accelerometer or motion sensor to determine an acceleration or speed of the UE, or the UE may use Wi-Fi locationing or GPS locationing to determine the acceleration or speed of the UE. In some implementations, the UE determines whether the speed or acceleration is greater than a threshold, which may indicate that the UE is in a HST scenario.

Figure 22:
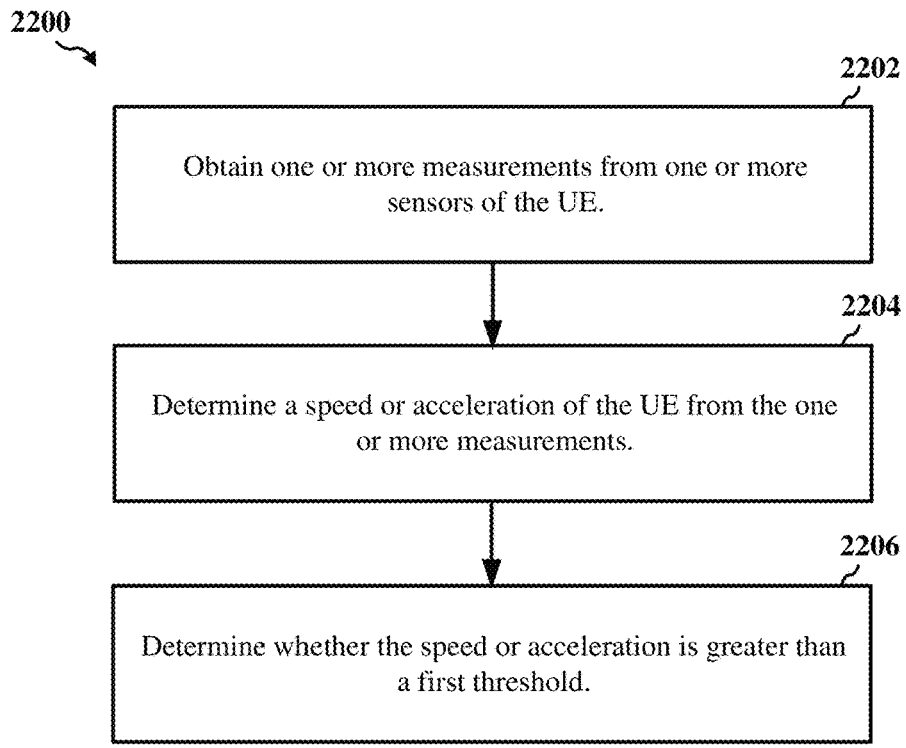
FIG. 22 shows a flowchart depicting an example operation for determining whether a wireless communication device is in a HST scenario based on the device's speed or acceleration.

FIG. 22 shows a flowchart depicting an example operation 2200 for determining whether a wireless communication device is in a HST scenario based on the device's speed or acceleration. The operation 2200 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In the examples, the wireless communication device is described as a UE, but any suitable wireless communication device may be used.

At 2202, the UE obtains one or more measurements from one or more sensors for the UE. At 2204, the UE determines a speed or acceleration of the UE from the one or more measurements. For example, the UE periodically may obtain one or more measurements from a motion sensor to determine a speed or acceleration of the UE. In another example, the UE periodically may obtain information from a GPS receiver (based on signals from multiple GPS satellites). The UE may use the information to determine geographic locations of the UE over time, and differences in the geographic locations over time may be used to determine a speed or acceleration of the UE. Location information over time also may be determined using Wi-Fi locationing or other wireless locationing, and the UE may determine a speed or acceleration based on the location information. At 2206, the UE determines whether the speed or acceleration is greater than a first threshold. The first threshold may be any suitable threshold, may be fixed or adjustable, and may be determined in any suitable manner. In some implementations, the first threshold may be a speed threshold to differentiate a UE on a HST from a UE not on a HST. For example, the first threshold may be 200 kph or 300 kph.

If the UE is in the HST scenario, the UE may be configured to listen for the TRS during CDRx. Determining whether the UE remains in the HST scenario (and the UE is to continue to listen for the TRS during CDRx) also may be based on whether the speed remains above a speed threshold. For example, when a user disembarks from a HST (or the HST reaches a final destination), the UE is no longer moving to require switching between repeaters of a BS. Determining whether the UE's speed remains above a speed threshold may indicate whether the UE is exiting the HST scenario.

Figure 23:
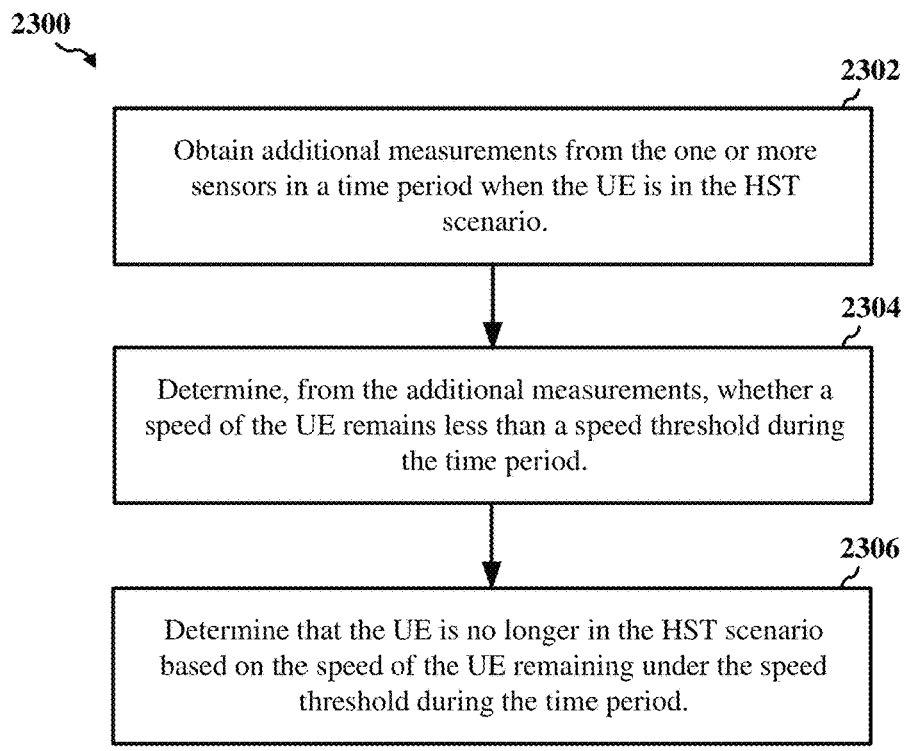
FIG. 23 shows a flowchart depicting an example operation for determining whether a wireless communication device is no longer in a HST scenario based on the device's speed.

FIG. 23 shows a flowchart depicting an example operation 2300 for determining whether a wireless communication device is no longer in a HST scenario based on the device's speed. The operation 2300 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In the examples, the wireless communication device is described as a UE, but any suitable wireless communication device may be used.

At 2302, the UE obtains additional measurements from the one or more sensors in a time period when the UE is in the HST scenario. The additional measurements may be similar to the measurements described above with reference to step 2202 in FIG. 22. At 2304, the UE determines, from the additional measurements, whether a speed of the UE remains less than a speed threshold during the time period. In the example, the speed being less than a speed threshold for a time period may indicate that the UE is no longer moving at a high speed. For example, if the HST stops for an extended amount of time (greater than the time period) or a user is standing on a train platform for greater than the time period, the UE may not be moving to require switching between repeaters of a BS. If the speed temporarily decreases below the speed threshold (for a length of time less than the time period), the UE may still be in the HST scenario. In this manner, the time period may be used to compensate for scenarios for which the HST slows down (such as for construction, icy track conditions, curves in the track, and so on) without determining that the UE is no longer in the HST scenario. At 2306, the UE may determine that the UE is no longer in the HST scenario based on the speed of the UE remaining under the speed threshold during the time period. The time period may be any suitable time period, and the speed threshold may be any suitable speed threshold. The time period or the speed threshold may be fixed or variable, may be determined by the device manufacturer, software, firmware, or the user, or otherwise may be determined or adjusted in any suitable manner.

In some implementations, determining whether the UE is in a HST scenario may be based on the location of the UE. For example, a network may be dedicated for a HST system (with the UEs on the network limited to users of the HST system), or the network may include BSs and repeaters located in specific locations for a highway system associated with vehicles travelling at a high speed to cause a UE in one of those vehicles to switch between the repeaters and BSs. The locations of the HST systems may be known (including the tracks and platforms of the HST system or the BSs and repeaters of the network dedicated to the HST system (which may be referred to as a HST network)), and the known geographic locations may be associated with determining that the UE is in a HST scenario. For example, a geographic area may be geofenced or otherwise indicate to a UE that the locations in the area are associated with a HST scenario. In some implementations, the UE may use a GPS receiver to determine whether the UE's location is in a geofenced area associated with a HST scenario. If the UE is in a geofenced area associated with a HST scenario, the UE may be configured to listen for TRS during CDRx.

Figure 24:
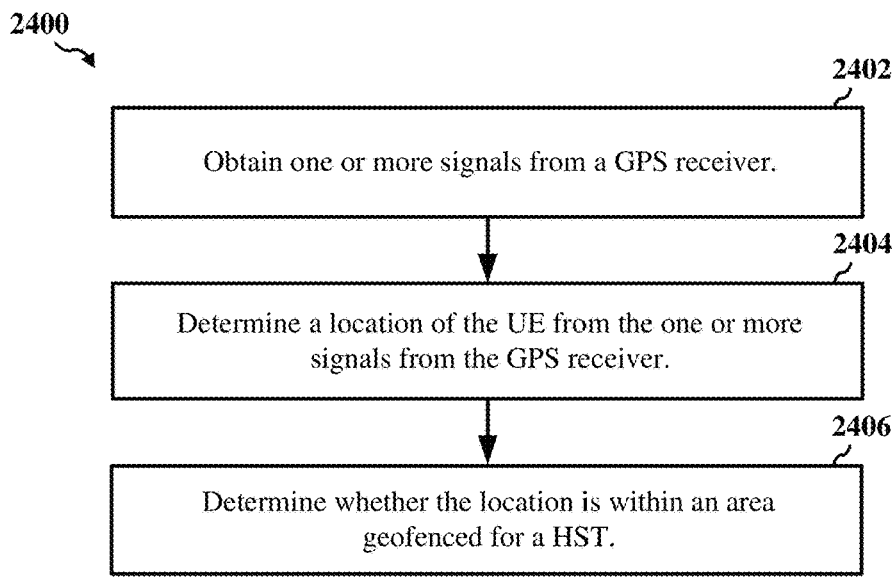
FIG. 24 shows a flowchart depicting an example operation for determining whether a wireless communication device is in a HST scenario based on the device's location.

FIG. 24 shows a flowchart depicting an example operation 2400 for determining whether a wireless communication device is in a HST scenario based on the device's location. The operation 2400 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In the examples, the wireless communication device is described as a UE, but any suitable wireless communication device may be used.

At 2402, the UE obtains one or more signals from a GPS receiver. At 2404, the UE determines a location of the UE from the one or more signals from the GPS receiver. At 2406, the UE determines whether the location is within an area geofenced for a HST. The UE may be determined to be in a HST scenario if the location is within an area geofenced for a HST. In this manner, the UE may be configured to listen for the TRS during CDRx. If the UE's location is not within an area geofenced for the HST, the UE may use SSBs obtained during CDRx for tracking. In some other implementations, the UE may determine whether the UE is approaching the area or is otherwise on a trajectory to enter the area. In this manner, the UE may predict whether the UE is about to enter a HST scenario.

Similar to using the UE's location to determine whether the UE is in the HST scenario, the UE's location may be used to determine whether the UE is no longer in the HST scenario. For example, if the UE determines that its location is no longer in an area geofenced for the HST, the UE no longer may be in the HST scenario.

Figure 25:
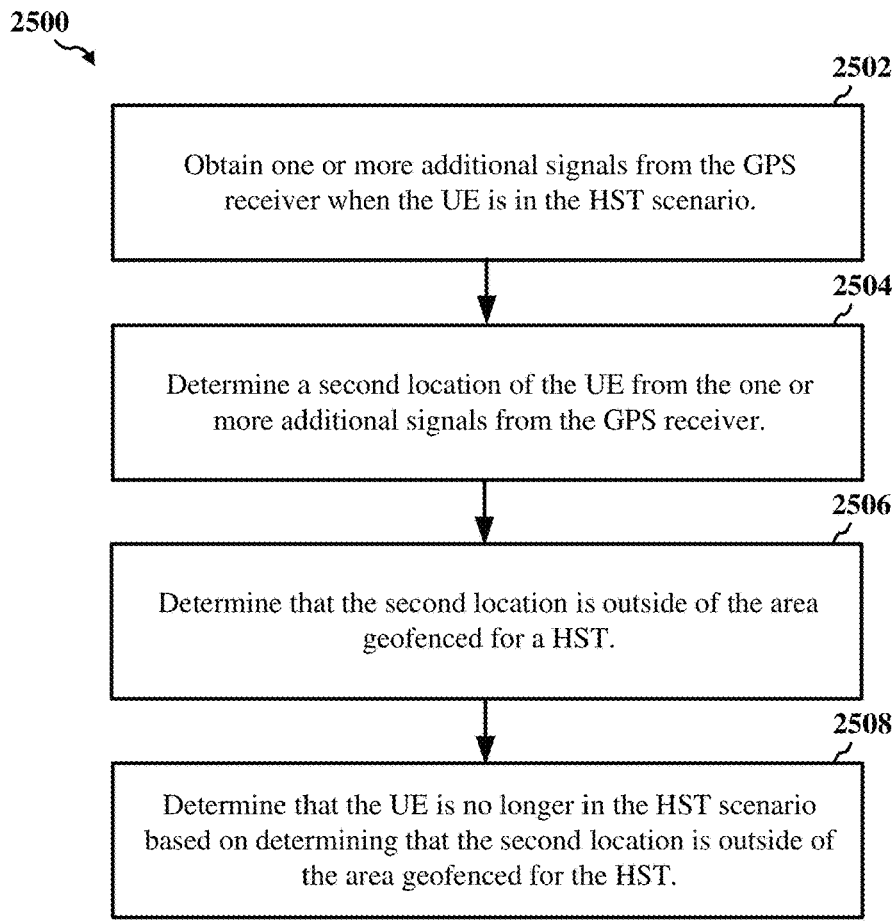
FIG. 25 shows a flowchart depicting an example operation for determining that a wireless communication device is no longer in a HST scenario based on the device's location.

FIG. 25 shows a flowchart depicting an example operation 2500 for determining that a wireless communication device is no longer in a HST scenario based on the device's location. The operation 2500 may be performed by an apparatus of a wireless communication device. The wireless communication device may be or may be included in a UE (such as a UE 104 in FIG. 1, UE 350 in FIG. 3, UE 480 in FIG. 4, or UE 580 or 590 in FIG. 5). In the examples, the wireless communication device is described as a UE, but any suitable wireless communication device may be used.

At 2502, the UE obtains one or more additional signals from the GPS receiver when the UE is in the HST scenario. At 2504, the UE determines a second location of the UE from the one or more additional signals from the GPS receiver. At 2506, the UE determines that the second location is outside of the area geofenced for a HST. At 2508, the UE determines that the UE is no longer in the HST scenario based on determining that the second location is outside of the area geofenced for the HST. If the UE is still in an area geofenced for a HST, the UE may remain configured to listen for the TRS during CDRx. If the UE's location is not within an area geofenced for the HST, the UE instead may use SSBs obtained during CDRx for tracking. In some other implementations, the UE may determine whether the UE is approaching a boundary of the area or is otherwise on a trajectory to exit the area. In this manner, the UE may predict whether the UE is about to exit a HST scenario.

Different example implementations are described for the UE to identify when to listen for a TRS during CDRx or to use obtained SSBs for tracking instead of listening for the TRS during CDRx. In some aspects, the example implementations may be complementary of one another or may be alternatives to one another. For example, a UE's speed may be used to verify a determination based on frequency error differences or instantaneous frequency errors that the UE is in a HST scenario. In another example, instantaneous frequency errors or frequency error differences may be used originally to determine that the UE is in a HST scenario, and the UE's speed being less than a threshold for a period of time may be used to determine that the UE is no longer in the HST scenario. Any implementation described above or any suitable combination of multiple implementations described above may be used in determining whether the UE is to be configured to listen for the TRS during CDRx. As described, the UE is able to selectively switch between listening for the TRS during CDRx or preventing listening for the TRS during CDRx. In this manner, the UE is able to increase power and resource savings without sacrificing wireless performance.

Implementation examples are described in the following numbered clauses:

1. A wireless communication device, including:
   a processing system configured to:
      identify whether the wireless communication device is in a high speed train (HST) scenario; and
      generate a frequency error by one or more frequency tracking loops (FTLs); and
   an interface configured to:
      obtain a tracking reference signal (TRS) during connected mode discontinuous reception (CDRx) when the wireless communication device is in the HST scenario, where generating the frequency error by the one or more FTLs includes using the TRS when the wireless communication device is in the HST scenario.

2. The wireless communication device of clause 1, where:
   the interface is configured to:
      obtain a synchronization signal block (SSB) during CDRx; and
   the processing system is configured to:
      generate the frequency error by the one or more FTLs using the SSB when the wireless communication device is not in the HST scenario.

3. The wireless communication device of one or more of clauses 1-2, where:
   the interface is configured to:
      prevent listening for the TRS during CDRx when the wireless communication device is not in the HST scenario.

4. The wireless communication device of one or more of clauses 1-3, where:
   the interface is configured to:
      obtain a first instance of the TRS; and
      obtain a second instance of the TRS; and
   the processing system is configured to:
      generate a first frequency error by the one or more FTLs using the first instance;
      generate a second frequency error by the one or more FTLs using the second instance; and
      generate an instantaneous frequency error using the first frequency error and the second frequency error, where identifying whether the wireless communication device is in the HST scenario includes identifying whether the instantaneous frequency error is greater than a frequency threshold.

5. The wireless communication device of one or more of clauses 1-4, where the instantaneous frequency error is a difference between the first frequency error and the second frequency error.

6. The wireless communication device of one or more of clauses 1-4, where:
   the interface is configured to:
      obtain a plurality of TRS instances in a first time period, where the plurality of TRS instances includes the first instance and the second instance; and
   the processing system is configured to:
      generate a plurality of instantaneous frequency errors using the plurality of TRS instances, where identifying whether the wireless communication device is in the HST scenario includes identifying whether a number of the plurality of instantaneous frequency errors greater than the frequency threshold is greater than a threshold number defined for the HST scenario.

7. The wireless communication device of one or more of clauses 1-6, where:
   the interface is configured to:
      obtain a second plurality of TRS instances in a second time period when the wireless communication device is in the HST scenario; and
   the processing system is configured to:
      generate a second plurality of instantaneous frequency errors using the second plurality of TRS instances; and
      identify whether the wireless communication device is no longer in the HST scenario, including identifying whether a number of the second plurality of instantaneous frequency errors greater than a second frequency threshold is less than a second threshold number defined for the HST scenario.

8. The wireless communication device of one or more of clauses 1-7 where:
the interface is configured to:
  prevent listening for the TRS during CDRx when the wireless communication device is no longer in the HST scenario.

9. The wireless communication device of one or more of clauses 1-8, where:
the interface is configured to:
  obtain a first SSB at a first time; and
  obtain a first TRS instance associated with the first time; and
the processing system configured to:
  generate, by the one or more FTLs, a first SSB frequency error using the first SSB;
  generate, by the one or more FTLs, a first TRS frequency error using the first TRS instance; and
  generate a frequency error difference between the first SSB frequency error and the first TRS frequency error, where identifying whether the wireless communication device is in the HST scenario includes using the frequency error difference.

10. The wireless communication device of one or more of clauses 1-9, where identifying whether the wireless communication device is in the HST scenario includes identifying whether the frequency error difference is greater than a frequency threshold.

11. The wireless communication device of one or more of clauses 1-10, where:
the interface is configured to:
  obtain a plurality of SSBs in a first time period, where the plurality of SSBs includes the first SSB and the first time period includes the first time; and
  obtain a plurality of TRS instances in the first time period, where the plurality of TRS instances includes the first TRS instance and each TRS instance of the plurality of TRS instances is associated with a SSB of the plurality of SSBs; and
the processing system is configured to:
  generate, by the one or more FTLs, a SSB frequency error for each SSB of the plurality of SSBs;
  generate, by the one or more FTLs, a TRS frequency error for each TRS instance of the plurality of TRS instances; and
  for each pair of associated SSB and TRS instance, generating a frequency error difference between the SSB frequency error generated for the SSB and the TRS frequency error generated for the TRS instance, where identifying whether the wireless communication device is in the HST scenario includes identifying whether a number of frequency error differences greater than the frequency threshold is greater than a threshold number defined for the HST scenario.

12. The wireless communication device of one or more of clauses 1-11, where:
the interface is configured to:
  obtain a second plurality of SSBs in a second time period when the wireless communication device is in the HST scenario; and
  obtain a second plurality of TRS instances in the second time period, where each TRS instance of the second plurality of TRS instances is associated with a SSB of the second plurality of SSBs; and the processing system is configured to:
  generate, by the one or more FTLs, a SSB frequency error for each SSB of the second plurality of SSBs;
  generate, by the one or more FTLs, a TRS frequency error for each TRS instance of the second plurality of TRS instances; and
  for each pair of associated SSB and TRS instance from the second plurality of SSBs and the second plurality of TRS instances, generate a frequency error difference between the SSB frequency error generated for the SSB and the TRS frequency error generated for the TRS instance; and
  identify whether the wireless communication device is no longer in the HST scenario, including identifying whether a number of the frequency error differences that are generated for the second plurality of SSBs and the second plurality of TRS instances being greater than a second frequency threshold is less than a second threshold number defined for the HST scenario.

13. The wireless communication device of one or more of clauses 1-12, where:
the interface is configured to:
  prevent listening for the TRS during CDRx when the wireless communication device is no longer in the HST scenario.

14. The wireless communication device of one or more of clauses 1-13, where:
the interface is configured to:
  obtain a second SSB at a second time; and
  obtain a second TRS instance associated with the second time;
and
the processing system is configured to:
  generate, by the one or more FTLs, a second SSB frequency error using the second SSB;
  generate, by the one or more FTLs, a second TRS frequency error using the second TRS instance; and
  generate a second frequency error difference between the second SSB frequency error and the second TRS frequency error, where identifying whether the wireless communication device is in the HST scenario includes identifying whether frequency error differences are increasing over time using the frequency error difference and the second frequency error difference.

15. A method performed by an apparatus of a wireless communication device, including:
identifying whether the wireless communication device is in a high speed train (HST) scenario;
receiving a tracking reference signal (TRS) during connected mode discontinuous reception (CDRx) when the wireless communication device is in the HST scenario; and
generating a frequency error by one or more frequency tracking loops (FTLs) using the TRS when the wireless communication device is in the HST scenario.

16. The method of clause 15, further including:
receiving a synchronization signal block (SSB) during CDRx; and
generating the frequency error by the one or more FTLs using the SSB when the wireless communication device is not in the HST scenario.

17. The method of one or more of clauses 15-16, further including preventing listening for the TRS during CDRx when the wireless communication device is not in the HST scenario.

18. The method of one or more of clauses 15-17, further including:
receiving a first instance of the TRS;
receiving a second instance of the TRS;
generating a first frequency error by the one or more FTLs using the first instance;
generating a second frequency error by the one or more FTLs using the second instance; and
generating an instantaneous frequency error using the first frequency error and the second frequency error, where identifying whether the wireless communication device is in the HST scenario includes identifying whether the instantaneous frequency error is greater than a frequency threshold.

19. The method of one or more of clauses 15-18, where the instantaneous frequency error is a difference between the first frequency error and the second frequency error.

20. The method of one or more of clauses 15-19, further including:
receiving a plurality of TRS instances in a first time period, where the plurality of TRS instances includes the first instance and the second instance; and
generating a plurality of instantaneous frequency errors using the plurality of TRS instances, where identifying whether the wireless communication device is in the HST scenario includes identifying whether a number of the plurality of instantaneous frequency errors greater than the frequency threshold is greater than a threshold number defined for the HST scenario.

21. The method of one or more of clauses 15-20, further including:
receiving a second plurality of TRS instances in a second time period when the wireless communication device is in the HST scenario;
generating a second plurality of instantaneous frequency errors using the second plurality of TRS instances; and
identifying whether the wireless communication device is no longer in the HST scenario, including identifying whether a number of the second plurality of instantaneous frequency errors greater than a second frequency threshold is less than a second threshold number defined for the HST scenario.

22. The method of one or more of clauses 15-21, further including preventing listening for the TRS during CDRx when the wireless communication device is no longer in the HST scenario.

23. The method of one or more of clauses 15-22, further including:
receiving a first SSB at a first time;
receiving a first TRS instance associated with the first time;
generating, by the one or more FTLs, a first SSB frequency error using the first SSB;
generating, by the one or more FTLs, a first TRS frequency error using the first TRS instance; and
generating a frequency error difference between the first SSB frequency error and the first TRS frequency error, where identifying whether the wireless communication device is in the HST scenario includes using the frequency error difference.

24. The method of one or more of clauses 15-23, where identifying whether the wireless communication device is in the HST scenario includes identifying whether the frequency error difference is greater than a frequency threshold.

25. The method of one or more of clauses 15-24, further including:
receiving a plurality of SSBs in a first time period, where the plurality of SSBs includes the first SSB and the first time period includes the first time;
receiving a plurality of TRS instances in the first time period, where the plurality of TRS instances includes the first TRS instance and each TRS instance of the plurality of TRS instances is associated with a SSB of the plurality of SSBs;
generating, by the one or more FTLs, a SSB frequency error for each SSB of the plurality of SSBs;
generating, by the one or more FTLs, a TRS frequency error for each TRS instance of the plurality of TRS instances; and
for each pair of associated SSB and TRS instance, generating a frequency error difference between the SSB frequency error generated for the SSB and the TRS frequency error generated for the TRS instance, where identifying whether the wireless communication device is in the HST scenario includes identifying whether a number of frequency error differences greater than the frequency threshold is greater than a threshold number defined for the HST scenario.

26. The method of one or more of clauses 15-25, further including:
receiving a second plurality of SSBs in a second time period when the wireless communication device is in the HST scenario;
receiving a second plurality of TRS instances in the second time period, where each TRS instance of the second plurality of TRS instances is associated with a SSB of the second plurality of SSBs;
generating, by the one or more FTLs, a SSB frequency error for each SSB of the second plurality of SSBs;
generating, by the one or more FTLs, a TRS frequency error for each TRS instance of the second plurality of TRS instances;
for each pair of associated SSB and TRS instance from the second plurality of SSBs and the second plurality of TRS instances, generating a frequency error difference between the SSB frequency error generated for the SSB and the TRS frequency error generated for the TRS instance; and
identifying whether the wireless communication device is no longer in the HST scenario, including identifying whether a number of the frequency error differences that are generated for the second plurality of SSBs and the second plurality of TRS instances being greater than a second frequency threshold is less than a second threshold number defined for the HST scenario.

27. The method of one or more of clauses 15-26, further including preventing listening for the TRS during CDRx when the wireless communication device is no longer in the HST scenario.

28. The method of one or more of clauses 15-27, further including:
receiving a second SSB at a second time;
receiving a second TRS instance associated with the second time;
generating, by the one or more FTLs, a second SSB frequency error using the second SSB;
generating, by the one or more FTLs, a second TRS frequency error using the second TRS instance; and
generating a second frequency error difference between the second SSB frequency error and the second TRS frequency error, where identifying whether the wireless communication device is in the HST scenario includes identifying whether frequency error differences are increasing over time using the frequency error difference and the second frequency error difference.

Other implementation examples are described in the following numbered clauses:

1. A method performed by an apparatus of a wireless communication device, including:
   determining whether the wireless communication device is moving;
   based on determining that the wireless communication device is moving, obtaining a tracking reference signal (TRS) during connected mode discontinuous reception (CDRx);
   determining a frequency error by one or more frequency tracking loops (FTLs) using the TRS; and
   determining a communication frequency based on the frequency error.
2. The method of clause 1, where:
   determining whether the wireless communication device is moving includes determining whether the wireless communication device is in a high speed train (HST) scenario; and
   obtaining the TRS during CDRx is based on determining that the wireless communication device is in the HST scenario.
3. The method of clause 2, further including:
   obtaining a synchronization signal block (SSB) during CDRx; and
   in response to determining that the wireless communication device is not in the HST scenario, determining the frequency error by the one or more FTLs using the SSB.
4. The method of clause 3, further including preventing listening for the TRS during CDRx in response to determining that the wireless communication device is not in the HST scenario.
5. The method of clause 2, further including:
   obtaining a first instance of the TRS and a second instance of the TRS before determining whether the wireless communication device is in the HST scenario, where the second instance is obtained after the first instance;
   determining a first frequency error by the one or more FTLs using the first instance;
   determining a second frequency error by the one or more FTLs using the second instance;
   determining an instantaneous frequency error for the second frequency error based on the first frequency error and the second frequency error; and
   determining whether the instantaneous frequency error is greater than a frequency threshold, where determining whether the wireless communication device is in the HST scenario is based on whether the instantaneous frequency error is greater than the frequency threshold.
6. The method of clause 5, where the instantaneous frequency error is a difference between the first frequency error and the second frequency error.
7. The method of clause 5, further including:
   obtaining a plurality of TRS instances in a first time period, where the plurality of TRS instances includes the first instance and the second instance;
   determining a plurality of instantaneous frequency errors from the plurality of TRS instances; and
   for each instantaneous frequency error, determining whether the instantaneous frequency error is greater than the frequency threshold, where determining whether the wireless communication device is in the HST scenario is based on whether the number of instantaneous frequency errors that are greater than the frequency threshold is greater than a threshold number defined for the HST scenario.
8. The method of clause 7, further including:
   obtaining a second plurality of TRS instances in a second time period and after determining that the wireless communication device is in the HST scenario;
   determining a second plurality of instantaneous frequency errors from the second plurality of TRS instances;
   for each of the second plurality of instantaneous frequency errors, determining whether the instantaneous frequency error is greater than a second frequency threshold; and
   determining that the wireless communication device is no longer in the HST scenario based on the number of instantaneous frequency errors greater than the second frequency threshold for the second plurality of instantaneous frequency errors being less than a second threshold number defined for the HST scenario.
9. The method of clause 8, further including preventing listening for the TRS during CDRx in response to determining that the wireless communication device is no longer in the HST scenario.
10. The method of clause 8, where a length of the second time period equals a length of the first time period.
11. The method of clause 8, where the second frequency threshold equals the frequency threshold.
12. The method of clause 8, where the second threshold number defined for the HST scenario equals the threshold number defined for the HST scenario.
13. The method of clause 2, further including:
    obtaining a first SSB at a first time before determining whether the wireless communication device is in the HST scenario;
    obtaining a first TRS instance associated with the first time;
    determining, by the one or more FTLs:
      a first SSB frequency error based on the first SSB; and
      a first TRS frequency error based on the first TRS instance; and
    determining a frequency error difference between the first SSB frequency error and the first TRS frequency error, where determining whether the wireless communication device is in the HST scenario is based on the frequency error difference.
14. The method of clause 13, further including determining whether the frequency error difference is greater than a frequency threshold, where determining whether the wireless communication device is in the HST scenario is based on whether the frequency error difference is greater than the frequency threshold.
15. The method of clause 14, further including:
    obtaining a plurality of SSBs in a first time period, where the plurality of SSBs includes the first SSB and the first time period includes the first time;
    obtaining a plurality of TRS instances in the first time period, where the plurality of TRS instances includes the first TRS instance and each TRS instance of the plurality of TRS instances is associated with a SSB of the plurality of SSBs;
    determining, by the one or more FTLs, a SSB frequency error for each SSB of the plurality of SSBs;
    determining, by the one or more FTLs, a TRS frequency error for each TRS instance of the plurality of TRS instances;

for each pair of associated SSBs and TRS instances, determining a frequency error difference between the SSB frequency error and the TRS frequency error; and for each frequency error difference, determining whether the frequency error difference is greater than the frequency threshold, where determining whether the wireless communication device is in the HST scenario is based on whether the number of frequency error differences that are greater than the frequency threshold is greater than a threshold number defined for the HST scenario.

16. The method of clause 15, further including:

obtaining a second plurality of SSBs in a second time period and after determining that the wireless communication device is in the HST scenario;

obtaining a second plurality of TRS instances in the second time period, where each TRS instance of the second plurality of TRS instances is associated with a SSB of the second plurality of SSBs;

determining, by the one or more FTLs, a SSB frequency error for each SSB of the second plurality of SSBs;

determining, by the one or more FTLs, a TRS frequency error for each TRS instance of the second plurality of TRS instances;

for each pair of associated SSBs and TRS instances from the second plurality of SSBs and the second plurality of TRS instances, determining a frequency error difference between the SSB frequency error and the TRS frequency error;

for each frequency error difference for the second plurality of SSBs and the second plurality of TRS instances, determining whether the frequency error difference is greater than a second frequency threshold; and determining that the wireless communication device is no longer in the HST scenario based on the number of frequency error differences greater than the second frequency threshold for the second plurality of SSBs and the second plurality of TRSs being less than a second threshold number defined for the HST scenario.

17. The method of clause 16, further including preventing listening for the TRS during CDRx in response to determining that the wireless communication device is no longer in the HST scenario.

18. The method of clause 16, where a length of the second time period equals a length of the first time period.

19. The method of clause 16, where the second frequency threshold equals the frequency threshold.

20. The method of clause 16, where the second threshold number defined for the HST scenario equals the threshold number defined for the HST scenario.

21. The method of clause 13, further including:

obtaining a second SSB at a second time, where the second time is before the first time;

obtaining a second TRS instance associated with the second time;

determining, by the one or more FTLs:

a second SSB frequency error based on the second SSB; and a second TRS frequency error based on the second TRS instance;

determining a second frequency error difference between the second SSB frequency error and the second TRS frequency error; and determining whether frequency error differences are increasing over time based on the first frequency error difference and the second frequency error difference, where determining whether the wireless communication device is in the HST scenario is based on determining whether the frequency error differences are increasing over time.

22. The method of clause 2, further including:

obtaining one or more measurements from one or more sensors of the wireless communication device;

determining a speed or acceleration of the wireless communication device from the one or more measurements; and determining whether the speed or acceleration is greater than a first threshold, where determining whether the wireless communication device is in the HST scenario is based on whether the speed or acceleration is greater than the first threshold.

23. The method of clause 22, further including:

obtaining additional measurements from the one or more sensors in a time period when the wireless communication device is in the HST scenario;

determining, from the additional measurements, that a speed of the wireless communication device remains less than a speed threshold during the time period; and determining that the wireless communication device is no longer in the HST scenario based on the speed of the wireless communication device remaining under the speed threshold during the time period.

24. The method of clause 23, further including preventing listening for the TRS during CDRx in response to determining that the wireless communication device is no longer in the HST scenario.

25. The method of clause 23, where the speed threshold equals the first threshold.

26. The method of clause 2, further including:

obtaining one or more signals from a global positioning system (GPS) receiver;

determining a location of the wireless communication device from the one or more signals from the GPS receiver; and determining whether the location is within an area geofenced for HST, where determining whether the wireless communication device is in the HST scenario is based on determining whether the location is within the area geofenced for HST.

27. The method of clause 26, further including:

obtaining one or more additional signals from the GPS receiver when the wireless communication device is in the HST scenario;

determining a second location of the wireless communication device from the one or more additional signals from the GPS receiver;

determining that the second location is outside of the area geofenced for HST; and determining that the wireless communication device is no longer in the HST scenario based on determining that the second location is outside of the area geofenced for HST.

28. The method of clause 27, further including preventing listening for the TRS during CDRx in response to determining that the wireless communication device is no longer in the HST scenario.

29. A wireless communication device including:

at least one modem;

at least one processor communicatively coupled with the at least one modem; and at least one memory communicatively coupled with the at least one processor and storing processor-readable code that, when executed by the at least one processor in conjunction with the at least one modem, is configured to perform the method of any one of clauses 1-28.

30. A mobile station including:
the wireless communication device of clause 29;
at least one transceiver coupled to the at least one modem;
at least one antenna coupled to the at least one transceiver to wirelessly transmit signals output from the at least one transceiver and to wirelessly receive signals for input into the at least one transceiver; and
a housing that encompasses the at least one modem, the at least one processor, the at least one memory, the at least one transceiver, and at least a portion of the at least one antenna.

As used herein, a phrase referring to "at least one of" or "one or more of" a list of items refers to any combination of those items, including single members. As an example, "at least one of: a, b, or c" and "one or more of: a, b, or c" are intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs (such as one or more modules of computer program instructions), encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, steps described in the different operations may be performed in different order or concurrently, and one or more instances of a step may be performed for the operation. Thus, the claims are not intended to be limited to the implementations shown herein, but are to be accorded the widest scope consistent with this disclosure, the principles and the novel features disclosed herein.

What is claimed is:

1. A wireless communication device, comprising:
an interface configured to:
obtain a first instance of a tracking reference signal (TRS); and
obtain a second instance of the TRS; and
a processing system configured to:
identify whether the wireless communication device is in a high speed train (HST) scenario;
generate a frequency error by one or more frequency tracking loops (FTLs);
generate a first frequency error by the one or more FTLs using the first instance;
generate a second frequency error by the one or more FTLs using the second instance; and
generate an instantaneous frequency error using the first frequency error and the second frequency error, wherein identifying whether the wireless communication device is in the HST scenario includes identifying whether the instantaneous frequency error is greater than a frequency threshold;
the interface further configured to:
obtain the TRS during connected mode discontinuous reception (CDRx) when the wireless communication device is in the HST scenario, wherein generating the frequency error by the one or more FTLs includes using the TRS when the wireless communication device is in the HST scenario.

2. The wireless communication device of claim 1, wherein:
the interface is configured to:
obtain a synchronization signal block (SSB) during CDRx; and
the processing system is configured to:
generate the frequency error by the one or more FTLs using the SSB when the wireless communication device is not in the HST scenario.

3. The wireless communication device of claim 2, wherein:
the interface is configured to:
prevent listening for the TRS during CDRx when the wireless communication device is not in the HST scenario.

4. The wireless communication device of claim 1, wherein the instantaneous frequency error is a difference between the first frequency error and the second frequency error.

5. The wireless communication device of claim 1, wherein:
the interface is configured to:
obtain a plurality of TRS instances in a first time period, wherein the plurality of TRS instances includes the first instance and the second instance; and
the processing system is configured to:
generate a plurality of instantaneous frequency errors using the plurality of TRS instances, wherein identifying whether the wireless communication device is in the HST scenario includes identifying whether a number of the plurality of instantaneous frequency errors greater than the frequency threshold is greater than a threshold number defined for the HST scenario.

6. The wireless communication device of claim 5, wherein:
the interface is configured to:
obtain a second plurality of TRS instances in a second time period when the wireless communication device is in the HST scenario; and
the processing system is configured to:
generate a second plurality of instantaneous frequency errors using the second plurality of TRS instances; and
identify whether the wireless communication device is no longer in the HST scenario, including identifying whether a number of the second plurality of instantaneous frequency errors greater than a second frequency threshold is less than a second threshold number defined for the HST scenario.

7. The wireless communication device of claim 6, wherein:
the interface is configured to:
prevent listening for the TRS during CDRx when the wireless communication device is no longer in the HST scenario.

8. The A wireless communication device of claim 1, wherein comprising:
a processing system configured to:
identify whether the wireless communication device is in a high speed train (HST) scenario; and
generate a frequency error by one or more frequency tracking loops (FTLs); and
an interface configured to:
obtain a tracking reference signal (TRS) during connected mode discontinuous reception (CDRx) when the wireless communication device is in the HST scenario, wherein generating the frequency error by the one or more FTLs includes using the TRS when the wireless communication device is in the HST scenario;
an interface configured to:
obtain a first synchronization signal block (SSB) at a first time; and
obtain a first TRS instance associated with the first time;
the processing system further configured to:
generate, by the one or more FTLs, a first SSB frequency error using the first SSB;
generate, by the one or more FTLs, a first TRS frequency error using the first TRS instance; and
generate a frequency error difference between the first SSB frequency error and the first TRS frequency error, wherein identifying whether the wireless communication device is in the HST scenario includes using the frequency error difference.

9. The wireless communication device of claim 8, wherein identifying whether the wireless communication device is in the HST scenario includes identifying whether the frequency error difference is greater than a frequency threshold.

10. The wireless communication device of claim 9, wherein:
the interface is configured to:
obtain a plurality of SSBs in a first time period, wherein the plurality of SSBs includes the first SSB and the first time period includes the first time; and
obtain a plurality of TRS instances in the first time period, wherein the plurality of TRS instances includes the first TRS instance and each TRS instance of the plurality of TRS instances is associated with a SSB of the plurality of SSBs; and
the processing system is configured to:
generate, by the one or more FTLs, a SSB frequency error for each SSB of the plurality of SSBs;
generate, by the one or more FTLs, a TRS frequency error for each TRS instance of the plurality of TRS instances; and
for each pair of associated SSB and TRS instance, generating a frequency error difference between the SSB frequency error generated for the SSB and the TRS frequency error generated for the TRS instance, wherein identifying whether the wireless communication device is in the HST scenario includes identifying whether a number of frequency error differences greater than the frequency threshold is greater than a threshold number defined for the HST scenario.

11. The wireless communication device of claim 10, wherein:
the interface is configured to:
obtain a second plurality of SSBs in a second time period when the wireless communication device is in the HST scenario; and
obtain a second plurality of TRS instances in the second time period, wherein each TRS instance of the second plurality of TRS instances is associated with a SSB of the second plurality of SSBs; and
the processing system is configured to:
generate, by the one or more FTLs, a SSB frequency error for each SSB of the second plurality of SSBs;
generate, by the one or more FTLs, a TRS frequency error for each TRS instance of the second plurality of TRS instances; and
for each pair of associated SSB and TRS instance from the second plurality of SSBs and the second plurality of TRS instances, generate a frequency error difference between the SSB frequency error generated for the SSB and the TRS frequency error generated for the TRS instance; and
identify whether the wireless communication device is no longer in the HST scenario, including identifying whether a number of the frequency error differences that are generated for the second plurality of SSBs and the second plurality of TRS instances being greater than a second frequency threshold is less than a second threshold number defined for the HST scenario.

12. The wireless communication device of claim 11, wherein:
the interface is configured to:
prevent listening for the TRS during CDRx when the wireless communication device is no longer in the HST scenario.

13. The wireless communication device of claim 8, wherein:
the interface is configured to:
obtain a second SSB at a second time; and
obtain a second TRS instance associated with the second time; and
the processing system is configured to:
generate, by the one or more FTLs, a second SSB frequency error using the second SSB;
generate, by the one or more FTLs, a second TRS frequency error using the second TRS instance; and
generate a second frequency error difference between the second SSB frequency error and the second TRS frequency error, wherein identifying whether the wireless communication device is in the HST scenario includes identifying whether frequency error differences are increasing over time using the frequency error difference and the second frequency error difference.

14. A method performed by an apparatus of a wireless communication device, comprising:
identifying whether the wireless communication device is in a high speed train (HST) scenario;
receiving a tracking reference signal (TRS) during connected mode discontinuous reception (CDRx) when the wireless communication device is in the HST scenario;
generating a frequency error by one or more frequency tracking loops (FTLs) using the TRS when the wireless communication device is in the HST scenario;
receiving a first instance of the TRS;
receiving a second instance of the TRS;
generating a first frequency error by the one or more FTLs using the first instance;
generating a second frequency error by the one or more FTLs using the second instance; and
generating an instantaneous frequency error using the first frequency error and the second frequency error, wherein identifying whether the wireless communication device is in the HST scenario includes identifying whether the instantaneous frequency error is greater than a frequency threshold.

15. The method of claim 14, further comprising:
receiving a synchronization signal block (SSB) during CDRx; and
generating the frequency error by the one or more FTLs using the SSB when the wireless communication device is not in the HST scenario.

16. The method of claim 15, further comprising preventing listening for the TRS during CDRx when the wireless communication device is not in the HST scenario.

17. The method of claim 14, wherein the instantaneous frequency error is a difference between the first frequency error and the second frequency error.

18. The method of claim 14, further comprising:
receiving a plurality of TRS instances in a first time period, wherein the plurality of TRS instances includes the first instance and the second instance; and
generating a plurality of instantaneous frequency errors using the plurality of TRS instances, wherein identifying whether the wireless communication device is in the HST scenario includes identifying whether a number of the plurality of instantaneous frequency errors greater than the frequency threshold is greater than a threshold number defined for the HST scenario.

19. The method of claim 18, further comprising:
receiving a second plurality of TRS instances in a second time period when the wireless communication device is in the HST scenario;
generating a second plurality of instantaneous frequency errors using the second plurality of TRS instances; and
identifying whether the wireless communication device is no longer in the HST scenario, including identifying whether a number of the second plurality of instantaneous frequency errors greater than a second frequency threshold is less than a second threshold number defined for the HST scenario.

20. The method of claim 19, further comprising preventing listening for the TRS during CDRx when the wireless communication device is no longer in the HST scenario.

21. A method performed by an apparatus of a wireless communication device, comprising:
receiving a first SSB at a first time;
receiving a first TRS instance associated with the first time;
identifying whether the wireless communication device is in a high speed train (HST) scenario;
generating a frequency error by one or more frequency tracking loops (FTLs); and
obtaining a tracking reference signal (TRS) during connected mode discontinuous reception (CDRx) when the wireless communication device is in the HST scenario, wherein generating the frequency error by the one or more FTLs includes using the TRS when the wireless communication device is in the HST scenario;
generating, by the one or more FTLs, a first SSB frequency error using the first SSB;
generating, by the one or more FTLs, a first TRS frequency error using the first TRS instance; and
generating a frequency error difference between the first SSB frequency error and the first TRS frequency error, wherein identifying whether the wireless communication device is in the HST scenario includes using the frequency error difference.

22. The method of claim 21, wherein identifying whether the wireless communication device is in the HST scenario includes identifying whether the frequency error difference is greater than a frequency threshold.

23. The method of claim 22, further comprising:
receiving a plurality of SSBs in a first time period, wherein the plurality of SSBs includes the first SSB and the first time period includes the first time;
receiving a plurality of TRS instances in the first time period, wherein the plurality of TRS instances includes the first TRS instance and each TRS instance of the plurality of TRS instances is associated with a SSB of the plurality of SSBs;
generating, by the one or more FTLs, a SSB frequency error for each SSB of the plurality of SSBs;

generating, by the one or more FTLs, a TRS frequency error for each TRS instance of the plurality of TRS instances; and for each pair of associated SSB and TRS instance, generating a frequency error difference between the SSB frequency error generated for the SSB and the TRS frequency error generated for the TRS instance, wherein identifying whether the wireless communication device is in the HST scenario includes identifying whether a number of frequency error differences greater than the frequency threshold is greater than a threshold number defined for the HST scenario.

24. The method of claim 23, further comprising:

receiving a second plurality of SSBs in a second time period when the wireless communication device is in the HST scenario;

receiving a second plurality of TRS instances in the second time period, wherein each TRS instance of the second plurality of TRS instances is associated with a SSB of the second plurality of SSBs;

generating, by the one or more FTLs, a SSB frequency error for each SSB of the second plurality of SSBs;

generating, by the one or more FTLs, a TRS frequency error for each TRS instance of the second plurality of TRS instances;

for each pair of associated SSB and TRS instance from the second plurality of SSBs and the second plurality of TRS instances, generating a frequency error difference between the SSB frequency error generated for the SSB and the TRS frequency error generated for the TRS instance; and identifying whether the wireless communication device is no longer in the HST scenario, including identifying whether a number of the frequency error differences that are generated for the second plurality of SSBs and the second plurality of TRS instances being greater than a second frequency threshold is less than a second threshold number defined for the HST scenario.

25. The method of claim 24, further comprising preventing listening for the TRS during CDRx when the wireless communication device is no longer in the HST scenario.

26. The method of claim 21, further comprising:

receiving a second SSB at a second time;

receiving a second TRS instance associated with the second time;

generating, by the one or more FTLs, a second SSB frequency error using the second SSB;

generating, by the one or more FTLs, a second TRS frequency error using the second TRS instance; and generating a second frequency error difference between the second SSB frequency error and the second TRS frequency error, wherein identifying whether the wireless communication device is in the HST scenario includes identifying whether frequency error differences are increasing over time using the frequency error difference and the second frequency error difference.

\* \* \* \* \*